(12) United States Patent　　　　(10) Patent No.:　US 12,619,226 B2

Gullikson et al.　　　　　　　　　　　(45) Date of Patent:　　　May 5, 2026

(54) ANOMALY DETECTION BASED ON NORMAL BEHAVIOR MODELING

(71) Applicant: SparkCognition, Inc., Austin, TX (US)

(72) Inventors: Kevin Gullikson, Pflugerville, TX (US); James Robert Eskew, Austin, TX (US); Uche Ohafia, Austin, TX (US)

(73) Assignee: AVATHON, INC., Austin, TX (US)

( * ) Notice: Subject to any disclaimer, the term of this patent is extended or adjusted under 35 U.S.C. 154(b) by 571 days.

(21) Appl. No.: 18/045,938

(22) Filed: Oct. 12, 2022

(65) Prior Publication Data

US 2023/0110056 A1　　Apr. 13, 2023

Related U.S. Application Data

(60) Provisional application No. 63/255,155, filed on Oct. 13, 2021.

(51) Int. Cl.
　　*G06F 3/048*　　　　(2013.01)
　　*G05B 23/02*　　　　(2006.01)
(52) U.S. Cl.
　　CPC ................................ *G05B 23/0283* (2013.01)
(58) Field of Classification Search
　　CPC .............. G05B 23/0283; G05B 23/024; G05B 23/0243; G05B 23/0267
　　See application file for complete search history.

(56) References Cited

U.S. PATENT DOCUMENTS

| | | |
|---|---|---|
| 2017/0364818 A1 | 12/2017 | Wu et al. |
| 2020/0231466 A1 | 7/2020 | Lu et al. |
| 2020/0379454 A1* | 12/2020 | Trinh .................... G05B 23/024 |
| 2021/0037037 A1* | 2/2021 | Oliner ................. H04L 63/1425 |
| 2021/0080939 A1 | 3/2021 | Yarmus et al. |
| 2022/0239758 A1* | 7/2022 | Klein ........................ G06N 5/04 |

OTHER PUBLICATIONS

Laxhammar (Online Learning and Sequential Anomaly Detection in Trajectories, 2014) (Year: 2014).*

International Search Report and Written Opinion for Application No. PCT/US2022/046453 dated Jan. 18, 2023, pp. 1-15.

* cited by examiner

*Primary Examiner* — Aleksey Olshannikov

(74) *Attorney, Agent, or Firm* — Moore IP Law

(57)　　　　　　ABSTRACT

A method of behavior monitoring includes determining, by one or more trained behavior models associated with a monitored asset, output data indicative of operation of the monitored asset. The method also includes determining a risk score based on the output data and determining feature importance data based on the output data. The method further includes determining whether to generate an alert based on the risk score and the feature importance data.

20 Claims, 10 Drawing Sheets

700

702

Receive sensor data from one or more sensors associated with a monitored asset

704

Provide input data to one or more behavior models to generate an anomaly score, where the one or more behavior models include at least one trained model

706

Determine whether to generate an alert based on the anomaly score

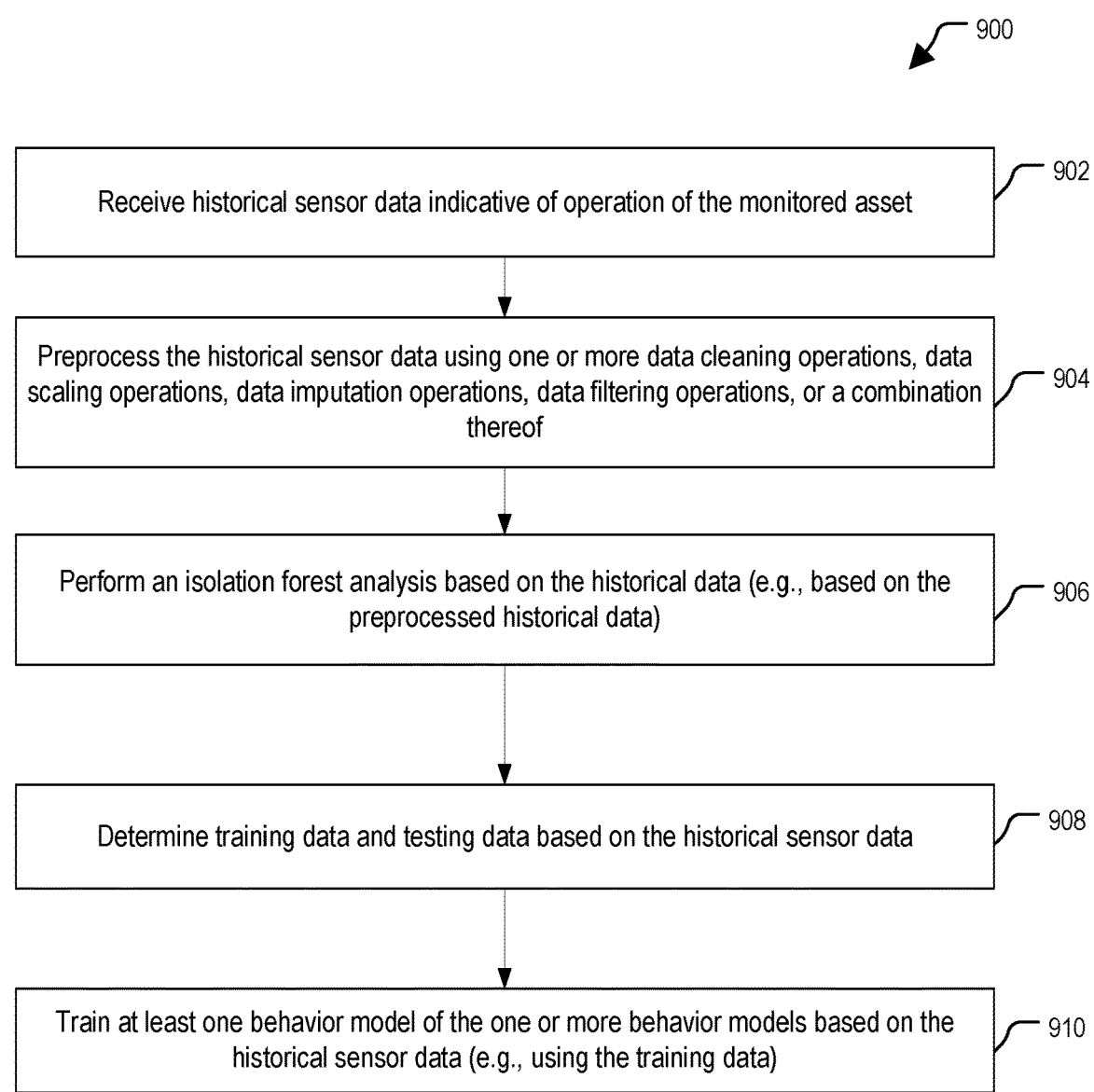

900

Receive historical sensor data indicative of operation of the monitored asset — 902

Preprocess the historical sensor data using one or more data cleaning operations, data scaling operations, data imputation operations, data filtering operations, or a combination thereof — 904

Perform an isolation forest analysis based on the historical data (e.g., based on the preprocessed historical data) — 906

Determine training data and testing data based on the historical sensor data — 908

Train at least one behavior model of the one or more behavior models based on the historical sensor data (e.g., using the training data) — 910

*FIG. 9*

ANOMALY DETECTION BASED ON NORMAL BEHAVIOR MODELING

CROSS-REFERENCE TO RELATED APPLICATIONS

The present application claims priority from U.S. Provisional Patent Application Ser. No. 63/255,155 entitled "ANOMALY DETECTION BASED ON NORMAL BEHAVIOR MODELING," filed Oct. 13, 2021, the contents of which are incorporated herein by reference in their entirety.

FIELD

The present disclosure is generally related to using trained models to detect anomalous behavior based on normal behavior modeling.

BACKGROUND

Abnormal behavior can be detected using rules established by a subject matter expert or derived from physics-based models. However, it can be expensive and time consuming to properly establish and confirm such rules. The time and expense involved is compounded if the equipment or process being monitored has several normal operational states or if what behavior is considered normal changes from time to time. To illustrate, as equipment operates, the normal behavior of the equipment may change due to wear. It can be challenging to establish rules to monitor this type of gradual change in normal behavior. Further, in such situations, the equipment may occasionally undergo maintenance to offset the effects of the wear. Such maintenance can result in a sudden change in normal behavior, which is also challenging to monitor using established rules.

SUMMARY

The present disclosure describes systems and methods that enable use of trained machine learning models to detect anomalous behavior of monitored devices, systems, or processes. Such monitored devices, systems, or processes are collectively referred to herein as "assets" for ease of reference. In some implementations, the models are automatically generated and trained based on historic data.

In some aspects, a method of behavior monitoring includes receiving sensor data from one or more sensors associated with a monitored asset and providing input data to one or more behavior models to generate an anomaly score. The one or more behavior models include at least one trained model. The method also includes determining whether to generate an alert based on the anomaly score.

In some aspects, a system for behavior monitoring includes one or more processors configured to receive sensor data from one or more sensors associated with a monitored asset and to provide input data to one or more behavior models to generate an anomaly score. The one or more behavior models include at least one trained model. The one or more processors are further configured to determine whether to generate an alert based on the anomaly score.

In some aspects, a computer-readable storage device stores instructions. The instructions, when executed by one or more processors, cause the one or more processors to receive sensor data from one or more sensors associated with a monitored asset and provide input data to one or more behavior models to generate an anomaly score. The one or more behavior models include at least one trained model. The instructions further cause the one or more processors to determine whether to generate an alert based on the anomaly score.

BRIEF DESCRIPTION OF THE DRAWINGS

FIG. 9 is a flow chart of an example of a method of training one or more models of the system of FIG. 2.

DETAILED DESCRIPTION

Figure 1:
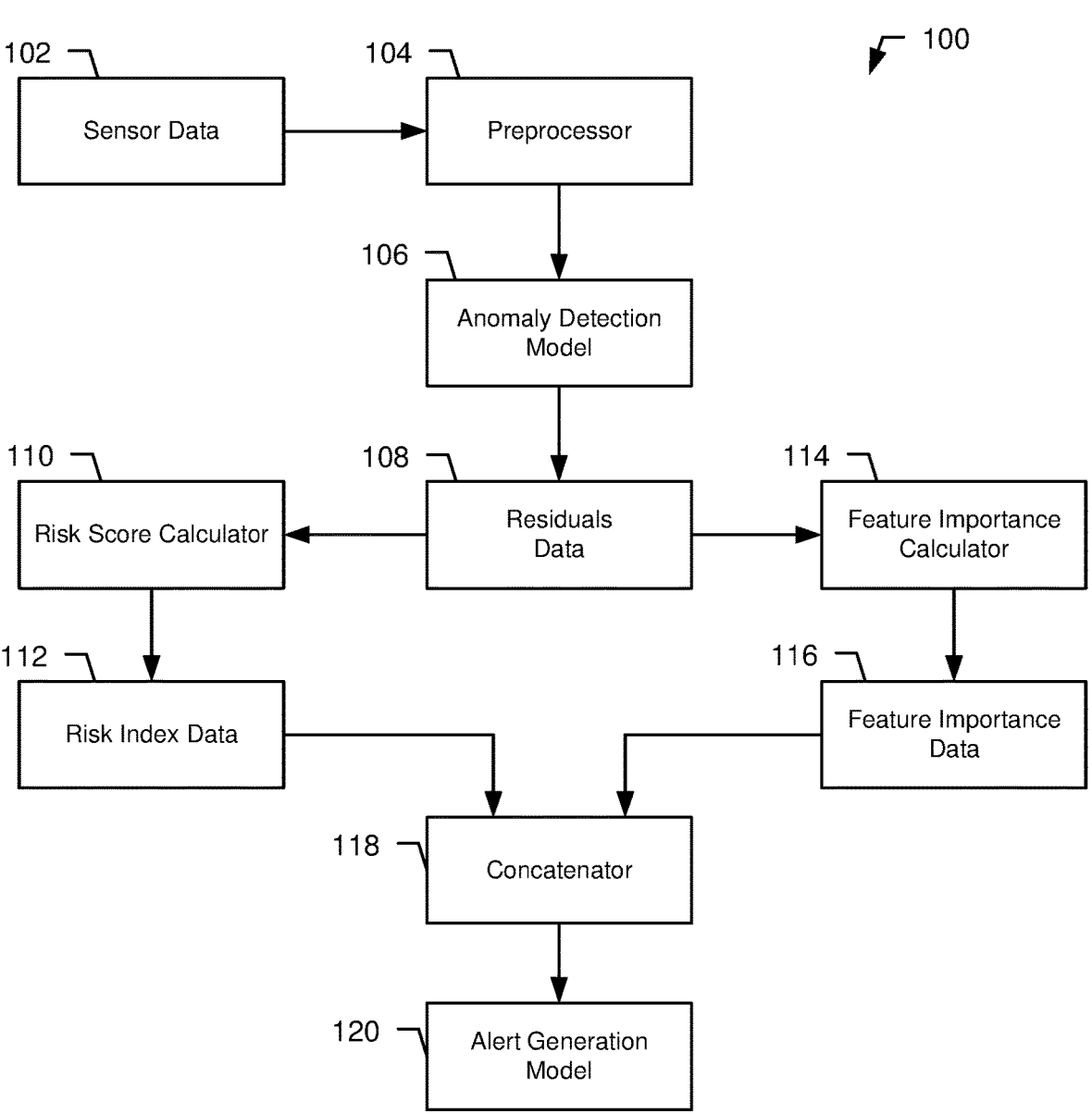
FIG. 1 is a diagram illustrating particular aspects of operations to detect anomalous behavior of a monitored asset in accordance with some examples of the present disclosure.

Systems and methods are described that enable automatic generation of anomaly detection models for monitored assets. Additionally, the systems and methods disclosed herein enable monitoring of assets to detect anomalous behavior. For example, the anomalous behavior may be indicative of an impending failure of the asset, and the systems and methods disclosed herein may facilitate prediction of the impending failure so that maintenance or other actions can be taken.

In an illustrative implementation, multiple anomaly detection models can be generated and scored relative to one another to select an anomaly detection model to be deployed. Factors used to generate a score for each anomaly detection model and a scoring mechanism used to generate the score can be selected based on data that is to be used to monitor the asset (e.g., the nature or type of sensor data to be used), based on particular goals to be achieved by monitoring (e.g., whether early prediction or a low false positive rate is to be preferred), or based on both.

The described systems and methods address a significant challenge in deploying anomaly detection models at scale (e.g., individual models for a large number of assets), especially where different types of models or different goals (e.g., different model scoring mechanisms) are used for the various assets. As a result, the described systems and methods can provide cost-beneficial anomaly detection for relatively large numbers of assets that are not identical, such as pumps and generators at an industrial plant.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further the terms "comprise," "comprises," and "comprising" may be used interchangeably with "include," "includes," or "including." Additionally, the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. Such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model.

For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." As described further below, in transfer learning a base model may be trained using a generic or typical data set, and the base model may be subsequently refined (e.g., re-trained or further trained) using a more specific data set.

A data set used during training is referred to as a "training set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training. The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components. As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building". In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a "general purpose" model can be trained to detect anomalies in vibration data associated with a variety of types of rotary equipment, and the general-purpose model can be used as the starting point to train a model for one or more specific types of rotary equipment, such as a first model for generators and a second model for pumps. As another example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that the during the runtime phase, the model is configured to determine which of multiple unlabeled "clusters" an input data sample is most likely to belong to.

As another example, to train a model to perform a regression task, during the creation/training phase, one or more data elements of the training data are input to the model being trained, and the model generates output indicating a predicted value of one or more other data elements of the training data. The predicted values of the training data are compared to corresponding actual values of the training data, and the computer modifies the model until the model accurately and reliably (e.g., within some specified criteria) predicts values of the training data. In this example, the model can subsequently be used (in a runtime phase) to receive data elements and predict values that have not been received. To illustrate, the model can analyze time series data, in which case, the model can predict one or more future values of the time series based on one or more prior values of the time series.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

One example of a machine-learning model is an autoencoder. An autoencoder is a particular type of neural network that is trained to receive multivariate input data, to process at least a subset of the multivariate input data via one or more hidden layers, and to perform operations to reconstruct the multivariate input data using output of the hidden layers. If at least one hidden layer of an autoencoder includes fewer nodes than the input layer of the autoencoder, the autoencoder may be referred to herein as a dimensional reduction model. If each of the one or more hidden layer(s) of the autoencoder includes more nodes than the input layer of the autoencoder, the autoencoder may be referred to herein as a denoising model or a sparse model, as explained further below.

For dimensional reduction type autoencoders, the hidden layer with the fewest nodes is referred to as the latent space layer. Thus, a dimensional reduction autoencoder is trained to receive multivariate input data, to perform operations to dimensionally reduce the multivariate input data to generate latent space data in the latent space layer, and to perform operations to reconstruct the multivariate input data using the latent space data. "Dimensional reduction" in this context refers to representing n values of multivariate input data using z values (e.g., as latent space data), where n and z are integers and z is less than n. Often, in an autoencoder the z values of the latent space data are then dimensionally expanded to generate n values of output data. In some special cases, a dimensional reduction model may generate m values of output data, where m is an integer that is not equal to n. As used herein, such special cases are still referred to as autoencoders as long as the data values represented by the input data are a subset of the data values represented by the output data or the data values represented by the output data are a subset of the data values represented by the input data. For example, if the multivariate input data includes 10 sensor data values from 10 sensors, and the dimensional reduction model is trained to generate output data representing only 5 sensor data values corresponding to 5 of the 10 sensors, then the dimensional reduction model is referred to herein as an autoencoder. As another example, if the multivariate input data includes 10 sensor data values from 10 sensors, and the dimensional reduction model is trained to generate output data representing 10 sensor data values corresponding to the 10 sensors and to generate a variance value (or other statistical metric) for each of the sensor data values, then the dimensional reduction model is also referred to herein as an autoencoder (e.g., a variational autoencoder).

Denoising autoencoders and sparse autoencoders do not include a latent space layer to force changes in the input data. An autoencoder without a latent space layer could simply pass the input data, unchanged, to the output nodes resulting in a model with little utility. Denoising autoencoders avoid this result by zeroing out a subset of values of an input data set while training the denoising autoencoder to reproduce the entire input data set at the output nodes. Put another way, the denoising autoencoder is trained to reproduce an entire input data sample based on input data that includes less than the entire input data sample. For example, during training of a denoising autoencoder that includes 10 nodes in the input layer and 10 nodes in the output layer, a single set of input data values includes 10 data values; however, only a subset of the 10 data values (e.g., between 2 and 9 data values) are provided to the input layer. The remaining data values are zeroed out. To illustrate, out of 10 data values, 7 data values may be provided to a respective 7 nodes of the input layer, and zero values may be provided to the other 3 nodes of the input layer. Fitness of the denoising autoencoder is evaluated based on how well the output layer reproduces all 10 data values of the set of input data values, and during training, parameters of the denoising autoencoder are modified over multiple iterations to improve its fitness.

Sparse autoencoders prevent passing the input data unchanged to the output nodes by selectively activating a subset of nodes of one or more of the hidden layers of the sparse autoencoder. For example, if a particular hidden layer has 10 nodes, only 3 nodes may be activated for particular data. The sparse autoencoder is trained such that which nodes are activated is data dependent. For example, for a first data sample, 3 nodes of the particular hidden layer may be activated, whereas for a second data sample, 5 nodes of the particular hidden layer may be activated.

One use case for autoencoders is detecting significant changes in data. For example, an autoencoder can be trained using training sensor data gathered while a monitored system is operating in a first operational mode. In this example, after the autoencoder is trained, real-time sensor data from the monitored system can be provided as input data to the autoencoder. If the real-time sensor data is sufficiently similar to the training sensor data, then the output of the autoencoder should be similar to the input data. Illustrated mathematically:

$$\widehat{x_k} - x_k \approx 0$$

where $\widehat{x_k}$ represents an output data value k and $x_k$ represents the input data value k. If the output of the autoencoder exactly reproduces the input, then $\widehat{x_k} - x_k = 0$ for each data value k. However, it is generally the case that the output of a well-trained autoencoder is not identical to the input. In such cases, $\widehat{x_k} - x_k = r_k$, where $r_k$ represents a residual value. Residual values that result when particular input data is provided to the autoencoder can be used to determine whether the input data is similar to training data used to train the autoencoder. For example, when the input data is similar to the training data, relatively small residual values should result. In contrast, when the input data is not similar to the training data, relatively large residual values should result. During runtime operation, residual values calculated based on output of the autoencoder can be used to determine the likelihood or risk that the input data differs significantly from the training data.

As one particular example, the input data can include multivariate sensor data representing operation of a monitored system. In this example, the autoencoder can be trained using training data gathered while the monitored system was operating in a first operational mode (e.g., a normal mode or some other mode). During use, real-time sensor data from the monitored system can be input to the autoencoder, and residual values can be determined based on differences between the real-time sensor data and output data from the autoencoder. If the monitored system transitions to a second operational mode (e.g., an abnormal mode, a second normal mode, or some other mode) statistical properties of the residual values (e.g., the mean or variance of the residual values over time) will change. Detection of such changes in the residual values can provide an early indication of changes associated with the monitored system. To illustrate, one use of the example above is early detection of abnormal operation of the monitored system. In this use case, the training data includes a variety of data samples representing one or more "normal" operating modes. During runtime, the input data to the autoencoder represents the current (e.g., real-time) sensor data values, and the residual values generated during runtime are used to detect early onset of an abnormal operating mode. In other use cases, autoencoders can be trained to detect changes between two or more different normal operating modes (in addition to, or instead of, detecting onset of abnormal operating modes).

FIG. 1 is a diagram 100 illustrating particular aspects of operations to detect anomalous behavior of a monitored asset in accordance with some examples of the present disclosure. The operations illustrated in FIG. 1 are performed by one or more processors, such as processor(s) of one or more server or cloud-based computing systems, one or more control systems, one or more desktop or laptop computers, one or more internet of things devices, etc. Data used by and generated by various of the operations are also illustrated in FIG. 1.

In FIG. 1, sensor data 102 is received and preprocessed at a preprocessor 104. The sensor data 102 includes raw time-series data, windowed or sampled time-series data, or other data representative of operation of one or more monitored assets. Non-limiting examples of the sensor data include a time series of temperature measurement values, a time series of vibration measurement values, a time series of voltage measurement values, a time series of amperage measurement values, a time series of rotation rate measurement values, a time series of frequency measurement values, a time series of packet loss rate values, a time series of data error values, a time series of pressure measurement values, measurements of other mechanical, electromechanical, electrical, or electronic metrics, or a combination thereof.

In a particular aspect, the sensor data 102 is multivariate data generated by multiple sensors of the same type or of different types. As an example of sensor data from multiple sensors of the same type, the sensor data 102 may include multiple time series of temperature values from temperature sensors associated with different locations of the monitored asset. As an example of sensor data from multiple sensors of different types, the sensor data 102 may include one or more time series of temperature values from one or more temperature sensors associated with the monitored asset and one or more time series of rotation rate values from one or more rotation sensors associated with the monitored assets.

The preprocessor 104 is configured to modify and/or supplement the sensor data 102 to generate preprocessed data for an anomaly detection model 106. Operations performed by the preprocessor 104 include, for example, filtering operations to remove outlying data samples, to reduce or limit bias (e.g., due to sensor drift or predictable variations), to remove sets of samples associated with particular events (such as data samples during a start-up period or during a known failure event), denoising, etc. In some implementations, the preprocessor 104 may also, or in the alternative, add to the sensor data 102, such as imputation to fill in estimated values for missing data samples or to equalize sampling rates of two or more sensors. In some implementations, the preprocessor 104 may also, or in the alternative, scale or normalize values of the sensor data 102. In some implementations, the preprocessor 104 may also, or in the alternative, determine new data values based on data value(s) in the sensor data 102. To illustrate, the sensor data 102 may include an analog representation of audio data, and the preprocessor 104 may sample the audio data and perform a time-domain to frequency-domain transformation (e.g., a Fast Fourier Transform) to generate a time series of frequency-domain spectra representing the audio data.

The preprocessor 104 may also, or alternatively, format input data for the anomaly detection model 106 based on the sensor data 102. For example, the preprocessed data for the anomaly detection model 106 may include an array of data values of the sensor data 102 and/or data values derived from the sensor data 102 via various preprocessing operations. To illustrate, in a particular implementation, each row of the array of data values represents a time step and each column of the array of values represents a particular value included in or derived from the sensor data 102.

The anomaly detection model 106 includes one or more behavior models. Each behavior model is trained to generate model output data based on at least a subset of the preprocessed data from the preprocessor 104. Examples of behavior models that may be included in the anomaly detection model 106 include, without limitation, dimensional reduction models, autoencoders, time series predictors, feature predictors, etc.

In one example, the anomaly detection model 106 includes an autoencoder that is trained to encode the input data into an encoded representation and to decode the encoded representation to generate the model output data. In this example, the model output data represents an attempt to recover the input data, and the difference between a particular input data sample and a corresponding output data sample is a residual value of residuals data 108.

In another example, the anomaly detection model 106 includes a time series predictor that is trained to predict a next value of a time series. To illustrate, the preprocessed data provided to the time series predictor may include current sensor data values associated with one or more sensors, and the time series predictor may generate the model output data indicating one or more predicted future values of the sensor data associated with the one or more sensors. In this example, a difference between one or more predicted future values of the sensor data and the corresponding actual values of the sensor data (received later in the time series) is a residual value of residuals data 108.

In another example, the anomaly detection model 106 includes a feature predictor that is trained to predict a value of one or more sensor data values based on one or more other sensor data values. To illustrate, the preprocessed data may include a temperature value from a temperature sensor, a rotation rate value from a rotation rate sensor, and a vibration value from a vibration sensor. In this illustrative example, the temperature value and the rotation rate value may be provided as input to the feature predictor, and the feature predictor may generate the model output data indicating a predicted vibration value. In this example, a difference between the predicted vibration value and the actual value as indicated in the preprocessed data is a residual value of residuals data 108.

As explained below, the behavior model is trained using data representing normal operation of a monitored system (or operation associated with a particular operational mode). The residual data 108 are indicative of how well the behavior model of the anomaly detection model 106 is able to represent operation of the monitored system as indicated by the sensor data 102. Thus, the anomaly detection model 106 is tuned or trained to accurately (as indicated by a small residual) represent operation of the monitored system during normal operation of the monitored system. When the input data includes data representing abnormal or anomalous behavior, the anomaly detection model 106 is not able to accurately represent operation of the monitored system, and as a result, one or more residual values in the residuals data 108 increase.

In the example illustrated in FIG. 1, a risk score calculator 110 uses the residuals data 108 to calculate risk scores to generate risk index data 112. In a particular example, a value of the risk index (i.e., a risk score) is calculated for each time step of the input data. In a non-limiting example, the risk score is calculated as an L2-norm of a rolling mean of the residual values, where the rolling mean is determined based on a sliding aggregation window. In another non-limiting example, the risk score is calculated as a rolling mean of L2-norms of the residual values. In a particular aspect, the anomaly detection model 106 is trained based on relationships (which may be nonlinear) between variables of training data. When the relationships between variables are similar in the training data set and the input data based on the sensor data, the residual values will be small and therefore the risk scores will also be small. In contrast, the risk scores will be large when at least one feature is poorly reconstructed or poorly estimated. This situation is likely to occur when the relationship of that feature with other features of the input data has changed relative to the training data set.

In the example illustrated in FIG. 1, a feature importance calculator 114 uses the residuals data 108 to calculate feature importance scores to generate feature importance data 116. In a particular example, a value of the feature importance data 116 is calculated for each time step of the input data. In a non-limiting example, the feature importance is calculated as a rolling mean of absolute values of the residual values.

In the example illustrated in FIG. 1, a concatenator 118 concatenates the risk index data 112 and the feature importance data 116 row-by-row to generate concatenated data for each time step. The concatenated data is provided to an alert generation model 120 that determines whether to generate an alert indication. For example, the alert generation model 120 may use a sequential probability ratio test (SPRT) to determine, based on the concatenated data, whether the sensor data for a particular time step or set of time steps is indicative of abnormal operation of the monitored asset(s). If the alert generation model 120 determines to generate an alert indication, the alert indication may include feature importance data indicating which features of the sensor data (or of the input data) have the greatest influence on the determination that the monitored asset(s) are behaving abnormally.

In some implementations, the preprocessor 104 adds values to the sensor data 102 to generate the input data, which is referred to as "imputation". In such implementations, the imputed value(s) are estimates that may be incorrect. The anomaly detection model 106 may not accurately reconstruct such imputed values, which results in high residual values associated with the imputed values. Such high residual values can skew the risk index data 112, the feature importance data 116, or both. To reduce downstream effects of errors introduced by the imputation of values, residual values corresponding to such imputed values may be masked out of the residual data 108 before the risk index data 112, the feature importance data 116, or both, are calculated.

In some implementations, whether to mask out values of the residual data 108 that correspond to imputed values of the input data is based on a user configurable setting. To illustrate, if a user is confident in an imputation process used by the preprocessor 104 for a particular feature or if the user has a high tolerance for false positives, the user can configure the user configurable setting to allow the risk score calculator 110 to calculate risk scores based on residual data 108 corresponding to imputed values. Conversely, if the user is not confident in the imputation process used by the preprocessor 104 for the particular feature or if the user has a low tolerance for false positives, the user can configure the user configurable setting to mask out values of the residual data 108 corresponding to imputed values before the risk score calculator 110 calculates risk scores. Similar options may be available to use or not use (e.g., mask out) residual data 108 corresponding to an imputed value for purposes of feature importance calculation. In some implementations, the user configurable setting specifies how residual data 108 corresponding to imputed values are treated for all features (e.g., the residual data 108 corresponding to imputed values are masked for all features of the input data or are unmasked for all features of the input data). In other implementations, a user configurable setting is associated with each feature of the input data or with groups of features of the input data (e.g., sensor data from each temperature sensor of a set of temperature sensors). In such implementations, each user configurable setting operates as described above with respect to its corresponding feature or group of features.

Figure 2:
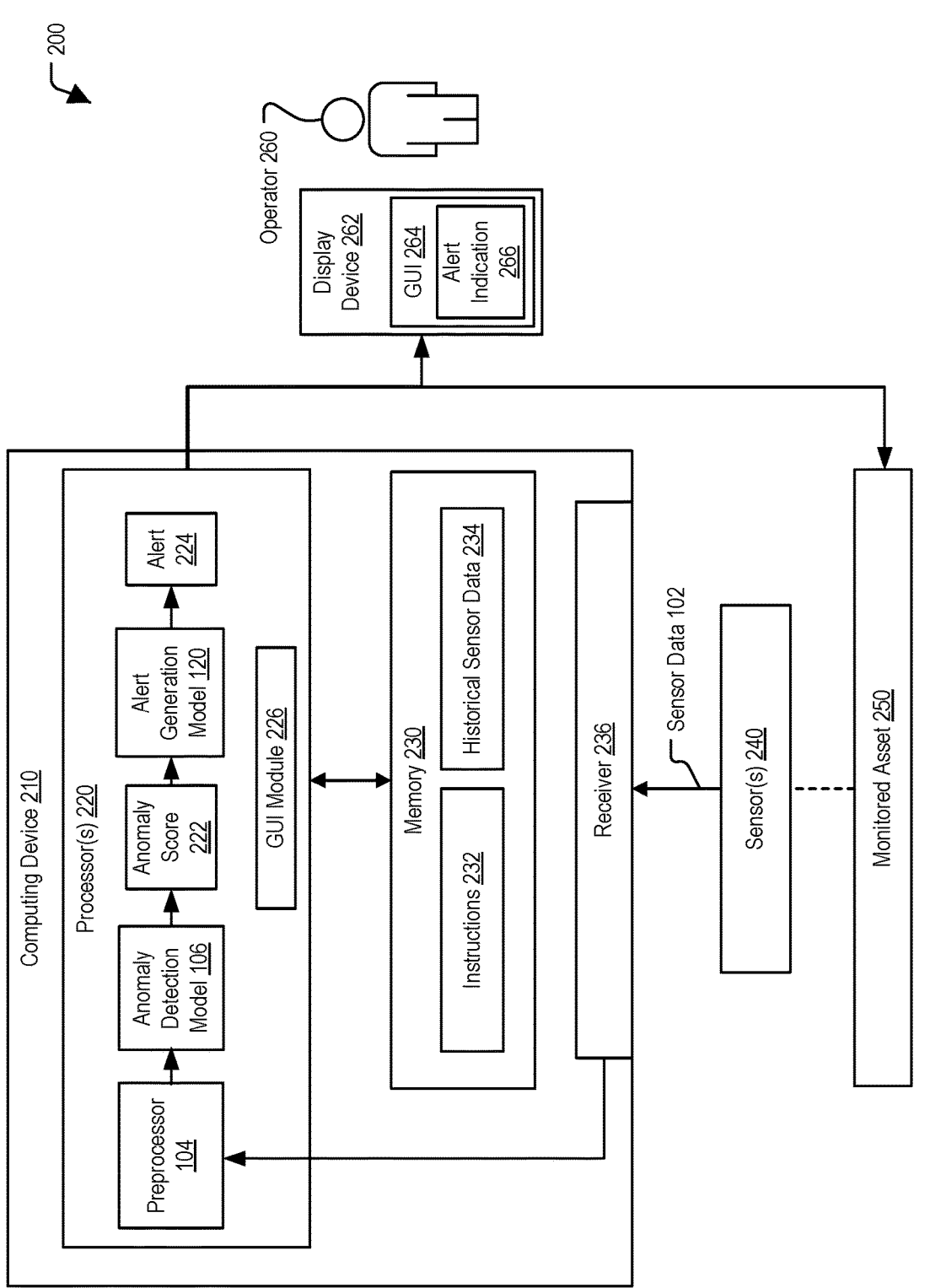
FIG. 2 is a block diagram illustrating a particular implementation of a system that may perform the operations of FIG. 1.

FIG. 2 depicts a system 200 to detect anomalous behavior of a monitored asset 250. The system 200 includes one or more sensors 240 coupled to the monitored asset 250. In this context, a "monitored asset" refers to one or more devices, one or more systems, or one or more processes that are monitored to detect abnormal behavior. To illustrate, the monitored asset 250 can include one or more mechanical devices, one or more electromechanical devices, one or more electrical devices, one or more electronic devices, or various combinations thereof.

A computing device 210 is coupled to the one or more sensors 240 and to a display device 262. The computing device 210 includes a receiver 236 and a memory 230 that are coupled to one or more processors 220. In various implementations, the computing device 210 is configured to use one or more trained models to determined, based on the sensor data 102, whether the monitored asset 250 is operating normally or abnormally and to selectively provide an alert indication 266 to an operator 260 (e.g., a technician or SME), as described further below.

In some implementations, the memory 230 includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof. The memory 230 stores data (e.g., historical sensor data 234) and instructions 232 (e.g., computer code) that are executable by the one or more processors 220. For example, the instructions 232 can include one or more trained models (e.g., trained machine learning models) that are executable by the one or more processors 220 to initiate, perform, or control the various operations described with reference to FIG. 1. For example, the one or more trained models can include the anomaly detection model 106, the alert generation model 120, or both.

The one or more processors 220 include one or more single-core or multi-core processing units, one or more digital signal processors (DSPs), one or more graphics processing units (GPUs), or any combination thereof. The one or more processors 220 are configured to receive, via the receiver 236, a portion of the sensor data 102 sensed during a sensing period. The one or more processors 220 are configured to preprocess the portion of the sensor data 102 to generate input data for the anomaly detection model 106 and to use the anomaly detection model 106 to generate an anomaly score 222 for each feature of the input data for each sensing period. The one or more processors 220 are also configured to process the anomaly score 222 using the alert generation model 120 to determine whether to generate an alert 224.

The GUI module 226 is executable by the one or more processors 220 to generate a graphical user interface 264 to display the alert indication 266. For example, the GUI module 226 may be executed by the one or more processors 220 to display the GUI 264 at the display device 262 to provide the operator 260 with the alert indication 266. The GUI 264 may also provide additional information related to the alert 224, such as feature importance data.

The receiver 236 is configured to receive the sensor data 102 from the one or more sensors 240. In an example, the receiver 236 includes a bus interface, a wireline network interface, a wireless network interface, or one or more other interfaces or circuits configured to receive the sensor data 102 via wireless transmission, via wireline transmission, or any combination thereof.

During operation, the sensor(s) 240 generate the sensor data 102 by measuring physical characteristics, electromagnetic characteristics, radiologic characteristics, or other measurable characteristics. Each sensor generates a time series of measurements. The time series from a particular sensor is also referred to herein as a "feature" or as "feature data". Different sensors may have different sample rates. One or more of the sensor(s) 240 may generate sensor data samples periodically (e.g., with regularly spaced sampling periods), and one or more others of the sensor(s) 240 may generate sensor data samples occasionally (e.g., whenever a state change occurs).

The preprocessor 104 receives the sensor data 102 for a particular timeframe. During some timeframes, the sensor data 102 for the particular timeframe may include a single data sample for each feature. During some timeframes, the sensor data 102 for the particular timeframe may include multiple data samples for one or more of the features. During some timeframes, the sensor data 102 for the particular timeframe may include no data samples for one or more of the features. As one example, if the sensor(s) 240 include a first sensor that only registers state changes (e.g., on/off state changes), a second sensor that generates a data sample once per second, and a third sensor that generates 10 data samples per second, and the preprocessor 104 processes one-second timeframes, then for a particular timeframe, the preprocessor 104 may receive sensor data 102 that includes no data samples from the first sensor (e.g. if no state change occurred), one data sample from the second sensor, and ten samples from the third sensor. Other combinations of sampling rates and preprocessing timeframes are used in other examples.

The preprocessor 104 generates input data for the anomaly detection model 106 based on the sensor data 102. For example, the preprocessor 104 may resample the sensor data 102, may filter the sensor data 102, may impute data, may use the sensor data (and possibly other data) to generate new feature data values, may perform other preprocessing operations as explained with reference to FIG. 1, or a combination thereof. In a particular aspect, the specific preprocessing operations that the preprocessor 104 performs are determined based on the training of the anomaly detection model 106, the alert generation model 120, or both. For example, the anomaly detection model 106 is trained to accept as input a specific set of features, and the preprocessor 104 is configured to generate, based on the sensor data 102, input data for the anomaly detection model 106 including the specific set of features.

In a particular aspect, the anomaly detection model 106 generates the anomaly score 222 for each data sample of the input data. The anomaly score 222 includes or corresponds to the residuals data 108, the risk index data 112, the feature importance data 116, or any combination thereof. For example, the anomaly score 222 may include concatenated data generated by the concatenator 118.

The alert generation model 120 evaluates the anomaly score 222 to determine whether to generate the alert 224. As one example, the alert generation model 120 compares one or more values of the anomaly score 222 to one or more respective thresholds to determine whether to generate the alert 224. The respective threshold(s) may be preconfigured or determined dynamically (e.g., based on one or more of the sensor data values, based on one or more of the input data values, or based on one or more of the anomaly score values). In a particular implementation, the alert generation model 120 determines whether to generate the alert 224 using a sequential probability ratio test (SPRT) based on current anomaly score values and historical anomaly score values (e.g., based on the historical sensor data 234).

Thus, the system 200 enables detection of deviation from an operating state of the asset, such as detecting a transition from a first operating state (e.g., a "normal" state to which the model is trained) to a second operating state (e.g., an "abnormal" state). In some implementations, the second operating state, although distinct from the first operating state, may also be a "normal" operating state that is not associated with a malfunction or fault of the monitored asset 250.

Although FIG. 2 depicts the display device 262 as coupled to the computing device 210, in other implementations the display device 262 is integrated within the computing device 210. Although the display device 262 is illustrated as providing the alert indication 266 via the GUI 264 at the display device 262, in other implementations the alert indication 266 may alternatively, or additionally, be provided via one or more other mechanisms, such as an output interface that includes at least one of a light, a buzzer, or a signal port. In some implementations, functionality corresponding to the sensor(s) 240 and the computing device 210 are integrated into a single device, such as within a common housing.

Figure 3:
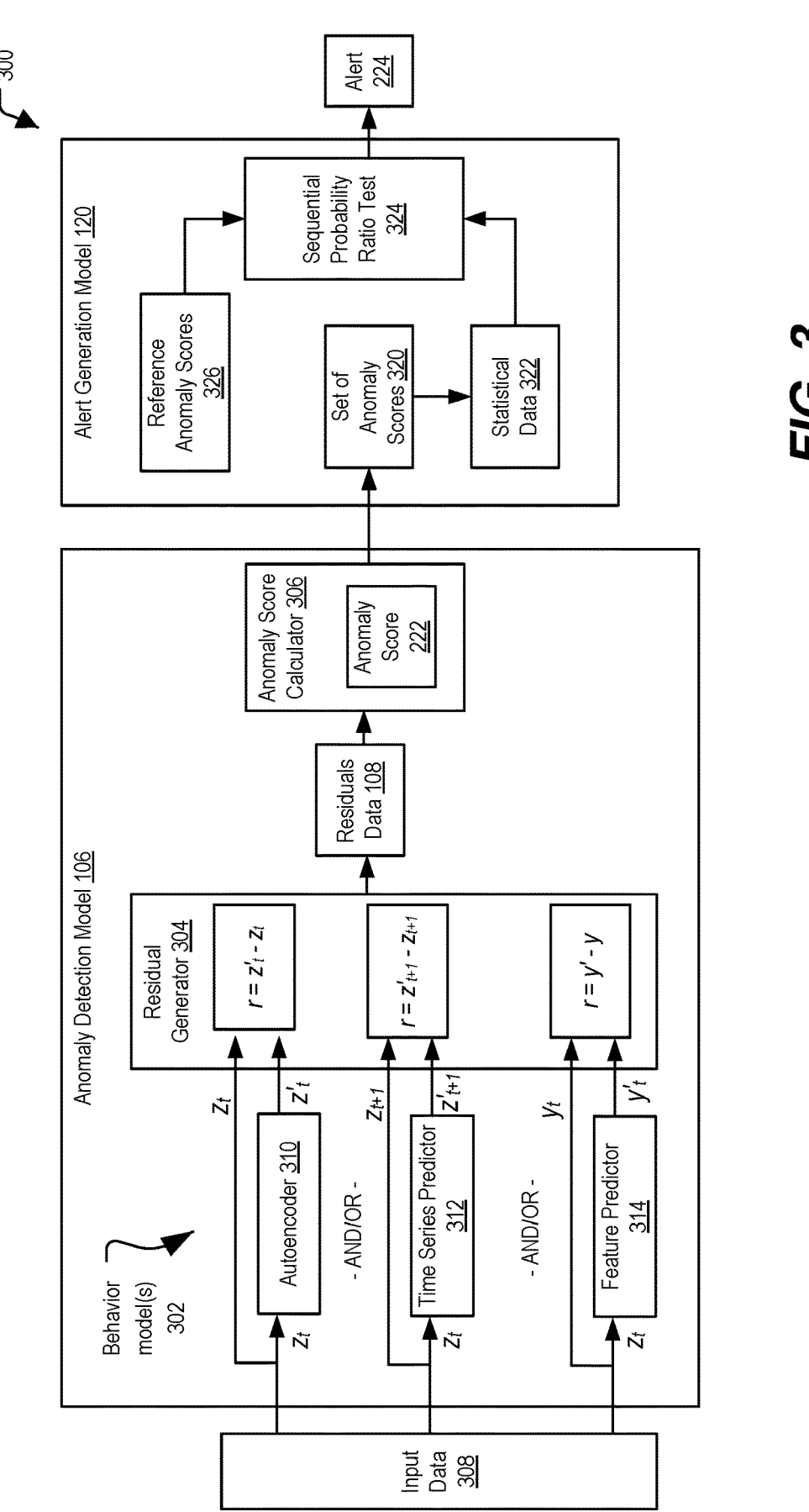
FIG. 3 is a block diagram of components that may be included in the system of FIG. 2 in accordance with some examples of the present disclosure.

FIG. 3 depicts a block diagram 300 of a particular implementation of components that may be included in the computing device 210 of FIG. 2. As illustrated, the anomaly detection model 106 includes one or more behavior models 302, a residual generator 304, and an anomaly score calculator 306. The one or more behavior models 302 include an autoencoder 310, a time series predictor 312, a feature predictor 314, another behavior model, or a combination thereof. Each of the behavior model(s) 302 is trained to receive input data 308 (e.g., from the preprocessor 104) and to generate a model output. The residual generator 304 is configured to compare one or more values of the model output to one or more values of the input data 308 to determine the residuals data 108.

The autoencoder 310 may include or correspond to a dimensional-reduction type autoencoder, a denoising autoencoder, or a sparse autoencoder. Additionally, in some implementations the autoencoder 310 has a symmetric architecture (e.g., an encoder portion of the autoencoder 310 and a decoder portion of the autoencoder 310 have mirror-image architectures). In other implementations, the autoencoder 310 has a non-symmetric architecture (e.g., the encoder portion has a different number, type, size, or arrangement of layers than the decoder portion).

The autoencoder 310 is trained to receive model input (denoted as $z_t$), modify the model input, and reconstruct the model input to generate model output (denoted as $z'_t$). The model input includes values of one or more features of the input data 308 (e.g., readings from one or more sensors) for a particular timeframe (t), and the model output includes estimated values of the one or more features (e.g., the same features as the model input) for the particular timeframe (t) (e.g., the same timeframe as the model input). In a particular, non-limiting example, the autoencoder 310 is an unsupervised neural network that includes an encoder portion to compress the model input to a latent space (e.g., a layer that contains a compressed representation of the model input), and a decoder portion to reconstruct the model input from the latent space to generate the model output. The autoencoder 310 can be generated and/or trained via an automated model building process, an optimization process, or a combination thereof to reduce or minimize a reconstruction error between the model input ($z_t$) and the model output ($z'_t$) when the input data 308 represents normal operation conditions associated with a monitored asset.

The time series predictor 312 may include or correspond to one or more neural networks trained to forecast future data values (such as a regression model or a generative model). The time series predictor 312 is trained to receive as model input one or more values of the input data 308 (denoted as $z_t$) for a particular timeframe (t) and to estimate or predict one or more values of the input data 308 for a future timeframe (t+1) to generate model output (denoted as $z'_{t+1}$). The model input includes values of one or more features of the input data 308 (e.g., readings from one or more sensors) for the particular timeframe (t), and the model output includes estimated values of the one or more features (e.g., the same features at the model input) for a different timeframe (t+1) that the timeframe of the model input. The time series predictor 312 can be generated and/or trained via an automated model building process, an optimization process, or a combination thereof, to reduce or minimize a prediction error between the model input ($z_t$) and the model output ($z'_{t+1}$) when the input data 308 represents normal operation conditions associated with a monitored asset.

The feature predictor 314 may include or correspond to one or more neural networks trained to predict data values based on other data values (such as a regression model or a generative model). The feature predictor 314 is trained to receive as model input one or more values of the input data 308 (denoted as $z_t$) for a particular timeframe (t) and to estimate or predict one or more other values of the input data 308 (denoted as $y_t$) to generate model output (denoted as $y'_t$). The model input includes values of one or more features of the input data 308 (e.g., readings from one or more sensors) for the particular timeframe (t), and the model output includes estimated values of the one or more other features of the input data 308 for the particular timeframe (t) (e.g., the same timeframe as the model input). The feature predictor 314 can be generated and/or trained via an automated model building process, an optimization process, or a combination thereof, to reduce or minimize a prediction error between the model input ($z_t$) and the model output ($y'_t$) when the input data 308 represents normal operation conditions associated with a monitored asset.

The residual generator 304 is configured to generate a residual value (denoted as r) based on a difference between the model output of the behavior model(s) 302 and the input data 308. For example, when the model output is generated by an autoencoder 310, the residual can be determined according to $r=z'_t-z_t$. As another example, when the model output is generated by a time series predictor 312, the residual can be determined according to $r=z'_{t+1}-z_{t+1}$, where $z'_{t+1}$ is estimated based on data for a prior time step (t) and $z_{t+1}$ is the actual value of z for a later time step (t+1). As still another example, when the model output is generated by a feature predictor 314, the residual can be determined according to $r=y'_t-y_t$, where $y'_t$ is estimated based on a value of z for a particular time step (t) and $y_t$ is the actual value of y for the particular time step (t). Generally, the input data 308 and the reconstruction are multivariate (e.g., a set of multiple values, with each value representing a feature of the input data 308), in which case multiple residuals are generated for each sample time frame to form the residual data 108 for the sample time frame.

The anomaly score calculator 306 determines the anomaly score 222 for a sample time frame based on the residual data 108. The anomaly score 222 is provided to the alert generation model 120.

In FIG. 3, the alert generation model 120 accumulates a set of anomaly scores 320 representing multiple sample time frames and uses the set of anomaly scores 222 to generate statistical data 322. In the illustrated example, the alert generation model 120 uses the statistical data 322 to perform a sequential probability ratio test 324 configured to selectively generate the alert 224. For example, the sequential probability ratio test 324 is a sequential hypothesis test that provides continuous validations or refutations of the hypothesis that the monitored asset is behaving abnormally, by determining whether the anomaly score 222 continues to follow, or no longer follows, normal behavior statistics of reference anomaly scores 326. In some implementations, the reference anomaly scores 326 include data indicative of a distribution of reference anomaly scores (e.g., mean and variance) instead of, or in addition to, the actual values of the reference anomaly scores. The sequential probability ratio test 324 provides an early detection mechanism and supports tolerance specifications for false positives and false negatives.

Figure 4:
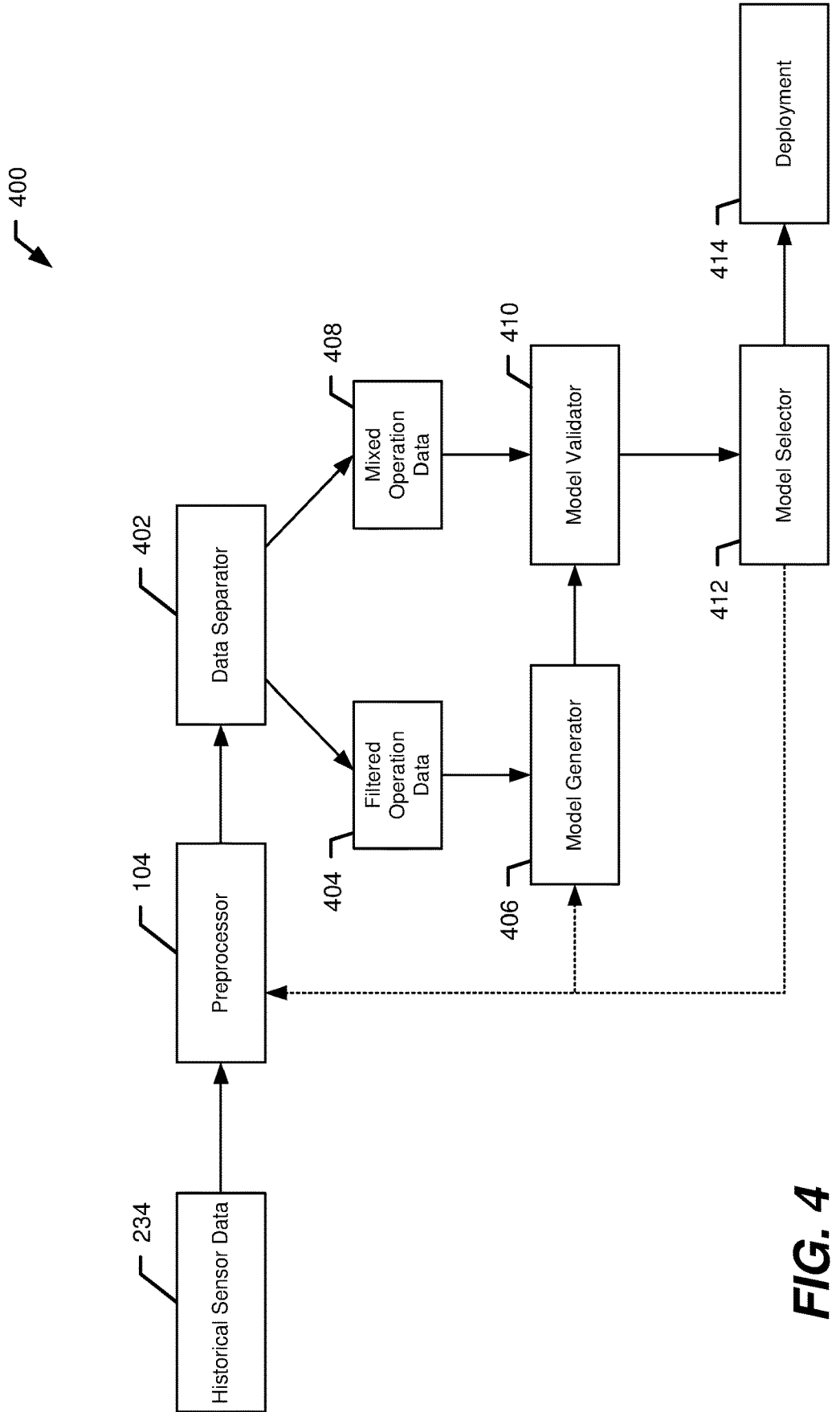
FIG. 4 is a block diagram illustrating particular aspects of operations to generate the anomaly detection model of FIG. 2 in accordance with some examples of the present disclosure.

FIG. 4 is a block diagram 400 illustrating particular aspects of operations to generate the anomaly detection model of FIGS. 2 and 3 in accordance with some examples of the present disclosure. The operations illustrated in FIG. 4 are performed by one or more processors, such as the processor(s) 220 of FIG. 2, which may include processor(s) of one or more server or cloud-based computing systems, one or more control systems, one or more desktop or laptop computers, one or more internet of things devices, etc. Data used by and generated by various of the operations are also illustrated in FIG. 4.

In FIG. 4, the historical sensor data 234 is received and preprocessed at the preprocessor 104. The preprocessor 104 operates as described with reference to FIGS. 1 and 2 except that the preprocessor 104 in FIG. 4 can use various configurable settings to determine how to preprocess the historical sensor data 234. After an anomaly detection model is generated and deployed to monitor one or more monitored assets, the settings used by the preprocessor 104 of FIG. 4 to generate the deployed anomaly detection model are fixed, as described with reference to FIG. 2.

Examples of settings that can be configured or tested during generation of an anomaly detection model include an output data setting (e.g., "output_tags") that indicates which features are to be predicted to produce residuals data 108. In some implementations, the settings include an input data setting (e.g., "input_tags") that indicates which features of the historical sensor data 234 are to be provided as input (e.g., the input data 308 of FIG. 3) to one or more models being trained. In such implementations, the output data setting may be set to be identical to the input data setting. In some implementations, the output data setting may identify a subset of the input data setting. In other implementations (such as when the behavior model(s) include a feature predictor 314), the output data setting is different from the input data setting.

In some implementations, a feature importance value will be determined (e.g., by the feature importance calculator 114 of FIG. 1) for each feature identified by the output data setting. In other implementations, a feature data setting is used to indicate which features of the output data should be used to determine a corresponding feature data value. In such implementations, a feature importance value may be determined for each feature of the output data or for only a subset (e.g., less than all) of the features of the output data.

In some implementations, a risk score value will be determined (e.g., by the risk score calculator 110) for each feature identified by the output data setting. In other implementations, a risk data setting is used to indicate which features of the output data should be used to determine a corresponding risk score. In such implementations, a risk score may be determined for each feature of the output data or for only a subset (e.g., less than all) of the features of the output data. Further, in some implementations, risk scores may be calculated for a first set of features and feature importance values may be calculated for a second set of features. In such implementations, the first set of features and the second set of features generally overlap but need not be identical. For example, risk scores can be calculated for a subset of features that are used to calculate feature importance values, or vice versa.

In some implementations, the settings used by the preprocessor 104 may indicate how particular features of the historical sensor data 234 are to be modified during preprocessing. For example, a digital setting may be associated with a feature to indicate that the feature has two valid values (e.g., on/off, etc.).

As another example, one or more scaling settings associated with a feature may indicate whether and/or how feature values of the feature are to be scaled. One type of scaling that can be used includes binning values into one or more predefined bins or one or more bins based on characteristics of the feature data. To illustrate, a first value (e.g., a 0) may be assigned to feature values that are near the average value (e.g., within one standard deviation of the mean value, etc.), a second value (e.g., –1) may be assigned to feature values that are much less than the average value (e.g., more than one standard deviation below the mean value, etc.), and a third value (e.g., 1) may be assigned to feature values that are much greater than the average value (e.g., more than one standard deviation above the mean value, etc.). Other examples of scaling that can be applied to a feature include minmax scaling, nonlinear scaling, and linear scaling (also referred to as "standard" scaling or z-score scaling). One example of nonlinear scaling includes shifting the data so that a median of the data is zero (0) and using an inverse hyperbolic sine function, which approximates a symmetric log-transform. Another example of nonlinear scaling is using a power transform, such as a box-cox transform.

In some implementations, a denoising setting may indicate a particular denoising process that is to be used, if any, for each feature of the historical sensor data 234. In some implementations, different denoising processes can be used for different features. Additionally, or alternatively, denoising can be applied to some features and not to other features. One example of a denoising process that can be used is Savitzky-Golay filtering.

In some implementations, one or more aggregation window settings indicate parameters of an aggregation window to be used for risk score and/or feature importance value calculation. For example, the aggregation window setting(s) may include a window size setting indicating a number of samples or a time duration to be represented by a window of samples used to calculate a risk score and/or a feature importance value. The aggregation window setting(s) may also, or in the alternative, include a window stride setting indicating how often a risk score or feature importance value is generated (e.g., as a multiple of a data sampling rate of the input data).

In FIG. 4, the preprocessor 104 processes the historical sensor data 234 to add data (e.g., to impute values), to removed data (e.g., to denoise values of a feature or to remove particular feature values from consideration), to modify data (e.g., to scale feature values), or a combination thereof. In some implementations, the particular operations performed by the preprocessor 104 are based on the configurable settings. In some implementations, the configurable settings are determined automatically and may be changed based on output of a model selector 412, as discussed further below.

The preprocessor 104 provides preprocessed historical sensor data to a data separator 402. The data separator 402 is configured to filter the preprocessed historical sensor data to generate filtered operation data 404. The filtered operational data 404 includes a subset of the preprocessed historical sensor data, and each sample period represented in the training data corresponds to a period when the monitored asset(s) appear to be operating normally.

The filtered operation data 404 is provided as input to a model generator 406. The model generator 406 is configured to generate training data (e.g., by further filtering the filtered operation data) and to train one or more models (e.g., one or more of the behavior models 302 of FIG. 3). As a particular example, the model generator 406 may generate and/or train one or more of an autoencoder 310, a time series predictor 312, a feature predictor 314, or another behavior model. In this example, generating a model includes changing a structure (e.g., architecture) or other hyperparameters of the model, and training the model includes changing link weights, biases, or both, without changing the structure of the model.

In particular implementations, the model generator 406 uses an optimization training technique (such as backpropagation, derivative free optimization, or an extreme learning machine) to train one or more models. For example, the model generator 406 may train a single model that has a specified architecture (e.g., a default architecture). In this example, the training can use training data based on the filtered operation data 404 and the optimization training technique to adjust link weights of the model to generate a trained model. In another example, the model generator 406 trains multiple models with different specified architecture (e.g., multiple default architectures). In this example, each of the models is trained using the training data and the optimization training technique to adjust link weights of the model to generate a set of multiple trained models. In yet another example, the model generator 406 generates one or more models by specifying or evolving an architecture of each model. In this example, each of the models may be trained using the training data and the optimization training technique, and the model generator 406 may modify the architecture of one or more of the models iteratively until a termination condition is satisfied.

After training one or more models, the model(s) may be validated by a model validator 410. The model validator 410 is configured to use mixed operation data 408 from the data separator 402 to determine whether each of the model(s) is able to distinguish normal operational behavior from abnormal operational behavior with sufficient reliability. In this context, sufficient reliability is determined based on specified reliability criteria, such as a false positive rate, a false negative rate, an accurate detection rate, or other metrics indicative of reliability of a model. Accordingly, the mixed operation data 408 includes data representing both normal and abnormal operation based on the historical sensor data 234.

In some implementations, a model that is sufficiently reliable is passed directly to deployment 414 where it can be used to monitor one or more assets to detect anomalous operation. In some implementations, after validation by the model validator 410 one or more models may be scored or ranked by a model selector 412 to determine which, if any, of the models is to be passed to deployment 414. In such implementations, if a particular model is not selected for deployment 414 by the model selector 412, the model selector 412 may instruct the model generator 406 to modify the model, to train the model further (e.g., using optimization training) or to generate and train a new model (e.g., using automated model building and optimization training).

In some implementations, if a particular model is not selected for deployment 414 by the model selector 412, the model selector 412 may instruct the preprocessor 104 to use different settings to generate training and validation data (e.g., the filtered operation data 404 and the mixed operation data 408, respectively) used by the model generator 406 and the model validator 410, and a new set of one or more models may be generated and/or trained based on the new training and validation data. For example, the preprocessor 104 may select a different subset of features of the historical sensor data 234 for inclusion in the training and validation data (e.g., by adjusting the input data setting described above). As another example, the preprocessor 104 may select a different set of features to be used to produce residual data (e.g., by adjusting the output data setting described above). In other examples, others of the settings described above are adjusted.

In some implementations, preprocessing, data separation, model training, model validation, model selection, or a subset thereof, may be repeated iteratively until a termination condition is satisfied. For example, the termination condition may be satisfied when the model selector 412 determines that one or more models meet the termination condition. In a particular implementation, a determination of whether a model satisfies the termination condition is based on a score determined for the model. In some implementations, different metrics are available to determine a score for each model and the particular metric(s) used depends on associated with the model selector 412.

In a particular aspect, the model selector 412 uses one or more metrics to score the model(s). Metrics to score models generally account for how well a model is able to correctly identify alert conditions in a data set. For purposes of model scoring, each model may be provided input data from a data set that includes data associated with one or more alert conditions and that includes labels indicating the beginning and ending of each alert condition. Put another way, the data set is labeled (such as by a subject matter expert) with ground truth information indicating which data correspond to alert conditions and which do not. A model scoring metric may consider various types of alert indications generated by a model based on the data set, such as: true positive (TP) alert indications, false positive (FP) alert indications, true negative (TN) alert indications, false negative (FN) alert indications, or a combination thereof. In general, a TP alert indication occurs when the model generates an indication of an alert condition for a sequence of data (e.g., a particular time range of the data set) that corresponds to an alert condition, a FP alert indication occurs when the model generates an indication of an alert condition for a sequence of data (e.g., a particular time range of the data set) that does not correspond to an alert condition, a TN alert indication occurs when the model does not generate an indication of an alert condition for a sequence of data (e.g., a particular time range of the data set) that does not correspond to an alert condition, and a FN alert indication occurs when the model does not generate an indication of an alert condition for a sequence of data (e.g., a particular time range of the data set) that corresponds to an alert condition. More detailed definitions of TP-, FP-, TN-, and FN-alert indications may take into account temporal relationships between alert conditions and alert indications, feature importance information, or other factors. Various metrics that may be used to score models by accounting for one or more of these alert indication types are described below.

In some implementations, alert recall may be used, alone or in combination with one or more other metrics, to score the model(s). Alert recall may be measured as a ratio of the number of TP alert indications and the total number of actual alert conditions represented in the data set (e.g., TP alert indications+FN alert indications) provided to the model.

In some implementations, alert precision may be used, alone or in combination with one or more other metrics, to score the models. Alert precision may be measured as a ratio of the number of TP alert indications over the total number alert indications (e.g., TP alert indications+FP alert indications) generated by the model for the data set One example of a metric that uses both alert recall and alert precision is an Fβ-score. An Fβ-score may be determined as:

$$F_\beta \text{ score} = \left(1 + \beta^2\right) \times \frac{\text{alert precision} \times \text{alert recall}}{\beta^2 \times \text{alert precision} + \text{alert recall}}$$

where β is a configurable parameter that can be adjusted to give more weight to alert precision or to alert recall.

In some implementations, a metric used for model scoring uses a configurable parameter to weight penalties applied to a model's model score for various performance criteria that a particular user (e.g., an owner or operator of a monitored system) is seeking to emphasize. As one example, a metric can apply a weighting factor to penalize a model missing alert conditions and/or for generating too many alert indications. To illustrate, a metric can be calculated as:

$$\text{metric} = c \times n_{missed}/n_{events} + n_{alerts}$$

where c is a value of the weighting factor (which is a configurable parameter), $n_{missed}$ is the number of alert conditions represented in a data set that the model missed (e.g., the number of FN alert indications), $n_{events}$ is the total number of alert conditions represented in the data set (e.g., the number of FN alert indications plus the number of TP alert indications), and $n_{alerts}$ is the number of alerts generated by the model for the data set (e.g., the number of TP and FP alert indications). In this illustrative example, a smaller value of the metric corresponds to a better model. Large values of c penalize the model more heavily for missing alert conditions (e.g., FN alert indications).

In a particular aspect, if a data set being used for model scoring does not include any alert conditions, the metric above can be modified such at the model is penalized for each alert indication generated above some allowable threshold (e.g., an FP threshold). To illustrate, when the data set does not include any true alert conditions, the metric above can be modified to:

$$\text{metric} = \max(0, n_{alerts} - \text{FP threshold})$$

where the FP threshold is a configurable parameter.

One benefit of the metric above is that it can be difficult and time consuming to distinguish FP and TP alert indications. Making this distinction may require examination of the data set by a subject matter expert. However, using the metric above, there is no need to make the distinction between FP and TP alert indications. Rather, the metric penalizes the model (by a weighted amount) for all alerts as represented by the $n_{alerts}$ value.

Alert recall, alert precision, $F_\beta$-scores, and other similar metrics based on the alert indication types listed above fail to fully capture certain aspects of model characterization that may be useful to score when evaluating a predictive maintenance model. For example, real-world alert conditions generally exist for a particular period of time, which introduces temporal considerations to model scoring. To illustrate, a real-world data set for a one-year period may include data representing three periods during which actual alert conditions existed. In this illustrative example, the first alert condition may be for a 1-minute period, the second alert condition may be for a 1-hour period, and the third alert condition may be for a 3-day period. Metrics that are based primarily or entirely on TP-, FP-, TN-, and FN-alert conditions may treat each of these alert conditions equally. Thus, a model that correctly detects the first alert condition and misses the second and third alert conditions may have a score equal to a model that correctly detects the third alert condition misses the first and second alert conditions. However, for preventative maintenance purposes, it is likely the case that correctly predicting the third alert condition is much more important than correctly predicting the first alert condition.

As another example, two models that each correctly generate an alert indication associated with the third alert condition and miss the first and second alert condition may receive the same model score using the techniques described above; however, these two models may have very different utility for preventative maintenance purposes. To illustrate, a first of the two models may correctly predict the third alert condition 5-seconds before onset of the third alert condition and a second of the two models may correctly predict the third alert condition 3-hours before onset of the third alert condition. In this illustrative example, the second model is likely more useful for preventive maintenance since it provides a longer lead time to correct underlying conditions leading to the alert.

One example of a model scoring metric that accounts for temporal considerations is referred to herein as a ucf-score, which can be considered a harmonic mean of an $F_\beta$ score and a uc-value. The uc-value is a metric indicating a proportion of the time period represented by the data sample during which the model generates correct results (e.g., TP- or TN-alert indications). In a particular aspect, the uc-value may be determined as:

$$uc\_value = \frac{T + I - D_{FN} - D_{FP}}{T}$$

where T is the total scoring window duration (e.g., in minutes), I is a cumulative ideality score, $D_{FN}$ is a cumulative duration of false negatives (e.g., in minutes) during the scoring window, and $D_{FP}$ is a cumulative duration of false positives (e.g., in minutes) during the scoring window.

In a particular aspect, several configurable parameters are used to determine the scoring window duration, the ideality score, the false negative duration, and the false positive duration. The configurable parameters include an ideal_start_lead_time (representing a maximum amount of time before the beginning of an alert condition when an ideal model would generate an alert indication) and an ideal_end_lead_time (representing a minimum amount of time before the beginning of an alert condition when an ideal model would generate an alert indication). In a particular implementation, the ideal_start_lead_time and the ideal_end_lead_time are user configurable parameters that estimate how much time an operator would need to react to a particular alert condition (e.g., to prevent the alert condition or to establish conditions that allow equipment to fail gracefully).

The configurable parameters may also include a min_lead_time parameter representing a minimum lead time for an alert to be considered useful. Alerts that are issued after this time are ignored and the alert condition is considered missed (e.g., is considered a false negative). The rationale behind the min_lead_time is that alerts with very short lead-times (e.g., a few seconds) do not provide an operator with sufficient time to respond, and as such are operationally useless for some situations.

Based on the configurable parameters, an ideality score value can be assigned to each TP alert indication. Generally, an alert indication may be considered to be a TP alert indication if the model generates an alert indication during a period (in a data set-based time domain) during which an alert condition was present in the data. To illustrate, if a min_lead_time is specified, a TP alert indication corresponds to an alert indication where alert_start_time<event_end_time−min_lead_time<=alert_end_time, where alert_start_time corresponds to a timestamp of when (in the data set-based time domain) the model generated an alert indication for an alert condition represented in the data set; event_end_time corresponds to a timestamp of an end (e.g., a completion) of the alert condition; and alert_end_time corresponds to a timestamp of when the model ceased generation of the alert indication (or indicated an end of the alert indication) for the alert condition represented in the data set.

For a TP alert indication, the ideality score can be determined using logic described below, in which alert_start_ideality_time=event_end_time−ideal_start_lead_time and alert_end_ideality_time=event_end_time−ideal_end_lead_time:

If    alert_start_ideality_time<=alert_start_time<=alert_end_ideality_time then ideality=0;

Elseif    alert_start_time>alert_end_ideality_time    then ideality=alert_end_ideality_time−alert_start_time;

Elseif    alert_start_time<alert_start_ideality_time    then ideality=alert_start_time−alert_start_ideality_time.

Note that based on the logic above, each ideality value is 0 or a negative number indicating a duration (e.g., minutes) of deviation from ideal values specified by the configurable parameters. The ideality values of the TP alert indications generated by a model are summed to generate the cumulative ideality score (I) used for the uc_value calculation.

If the model generates an alert that does not meet the criteria to be a TP alert indication (e.g., does not meet alert_start_time<event_end_time−min_lead_time<=alert_end_time), that alert indication is considered a FP alert indication and is used to determine a false positive duration value. In a particular aspect, each false positive duration value may be determined as:

$$FP\_duration=alert\_end\_time−alert\_start\_time$$

The false positive duration values during the scoring window duration are summed to generate the cumulative duration of false positives ($D_{FP}$) used for the uc_value calculation.

If the model fails to generate an alert indication when an alert condition is present, the duration of the alert condition is used as an FN duration associated with the alert condition. To illustrate, the FN duration for a particular missed alert condition may be determined as:

$$FN\_duration = event\_end\_time - event\_start\_time$$

The FN durations for alert conditions that are missed during the scoring window are summed to generate the cumulative duration of false negatives ($D_{FN}$) used for the uc_value calculation.

As described above, in some implementations, the ucf-score for a particular model may be determined based on a harmonic mean of an $F_\beta$ score for the particular model and a uc-value for the particular model. In such implementations, the configurable parameters may also include a $\beta$ value for the $F_\beta$ score and a weighting parameter for weighting the $F_\beta$ score and the uc-value to calculate the harmonic mean.

In some implementations, a metric for model scoring takes into account how well feature importance data generated by the model matches expected feature importance values associated with various alert conditions represented in a data set used for model scoring. To facilitate scoring a model based on feature importance values, a subject matter expert may associate expected feature labels with alert conditions represented in a data set. The model being scored may be provided the data set, or portions thereof, in order to generate alert indications and feature importance data. The alert indications generated by the model are compared to the labeled data set to assign a model score. In some implementations, a model score based on feature importance data can be used with, or combined with, one or more other model scores, such as a model score based on alert recall, alert precision, $F_\beta$-scores, alert indication types (e.g., TP-, FP-, TN-, and FN-alert conditions), temporal considerations, or a combination thereof.

In a particular aspect, a feature importance-based metric is based on a feature match score. The feature match score indicates how well feature importance data generated by the model matches expected feature importance data. Since expected feature importance data is only associated with actual alert conditions, the feature match score may be calculated only for TP alert indications (e.g., for alert indications that correspond to alert conditions in the labeled data set). Various mechanisms can be used to determine whether an alert indication corresponds to a particular alert condition. For example, an alert indication that starts after an alert condition starts and ends before the alert condition ends can be considered to correspond to the alert condition. In this example, a time period associated with the alert indication is fully bounded by a time period associated with the alert condition. As another example, an alert indication that starts after an alert condition starts or ends before the alert condition ends can be considered to correspond to the alert condition. In this example, the time period associated with the alert indication overlaps the time period associated with the alert condition. A feature match score may be calculated for each alert indication generated by the model that corresponds to an alert condition in the data set.

As one example, the feature match score is based on the feature importance value assigned to each feature (e.g., a numerical value assigned by the feature importance calculator 114 of FIG. 1). In this example, the labels assigned to the data set indicate expected feature importance values, and the feature match score is indicative of how well the model assigned feature importance values match the expected feature importance values. In a particular aspect, a single feature match score is calculated for each alert condition timestamp of the data set based on the set of feature importance values assigned by the model. To illustrate, the model assigned feature importance values may be aggregated (e.g., summed through time) and normalized based on a representative range of expected feature importance values to generate the single feature match score for an alert condition. As another example, the feature match score is based on feature importance ranking of the features (e.g., a relative importance ranking based on the feature importance values). In this example, the labels assigned to the data set indicate expected feature importance rankings, and the feature match score is indicative of how well the model ranked the feature importance of the features. In a particular aspect, a single feature match score is calculated for the model based on the set of feature importance ranks assigned by the model. To illustrate, the model assigned feature importance ranks may be aggregated (e.g., summed through time) and normalized based on a representative range of expected feature importance ranks to generate the single feature match score for the model).

In a particular aspect, one alert indication generated by the model may align in time with more than one alert condition in the data set. In this situation, the alert indication may be assigned to a single alert condition. To illustrate, the alert indication may be associated with the alert condition with which it has the largest feature match score.

Additionally, or alternatively, one alert condition in the data set may align in time with more than one alert indication generated by the model. In this situation, a single alert indication may be assigned to the alert condition. To illustrate, the alert condition may be associated with the alert indication with the largest feature match score for the alert condition. Alternatively, since more than one alert indication may legitimately align with a particular alert condition, the feature match scores of alert indications that match the alert condition may be aggregated. For example, a maximum, minimum, average, or weighted average of the feature match scores can be used.

After determining a feature match score for each alert indication, alert-domain recall and alert-domain precision can be calculated. In a particular aspect, alert-domain recall indicates a fraction of alert conditions detected based on feature match scores, where each feature match score has a value between 0 and 1 indicating how well the feature importance data associated with the alert indication matches the expected feature importance values associated with the alert condition. In some implementations, weighting values may be assigned to the alert conditions in the data set (e.g., to indicate which alert conditions a subject matter expert considers to be more important for the model to detect), and the alert-domain recall can be calculated based on the weighting values. For example, the alert-domain recall can be calculated as:

$$\text{recall} = \frac{1}{\sum_{e \in events} w_e} \times \sum_{e \in events} w_e \times \text{FM\_score}\ (e)$$

where $w_e$ is a weight value assigned to a particular event (i.e., a particular alert condition of the data set) and FM_score(e) is the feature match score for the particular event e. If more than one alert indication is associated with a particular alert condition, a representative feature match score can be used for FM_score(e). For example, the FM_score(e) value for a particular alert condition may be the maximum feature match score associated with the alert condition.

In a particular aspect, alert-domain precision indicates a fraction of alert indications that are TP alert indications based on the feature match scores, where each feature match score has a value between 0 and 1 indicating how well the feature importance data associated with the alert indication matches the expected feature importance values associated with the alert condition. For example, the alert-domain precision can be calculated as:

$$precision = \frac{1}{num\_alerts} \times \sum_{a \in alerts} FM\_score\ (a)$$

where num_alerts is a count of the number of alert indications (e.g., alerts) generated by the model during a scoring window and FM_score(a) is the feature match score for a particular alert a. If more than one feature match score is associated with an alert indication, a representative feature match score can be used for FM_score(a). For example, the FM_score(a) value for a particular alert indication may be the maximum feature match score associated with the alert indication.

In some implementations, the model score for a particular model corresponds to an alert-domain $F_\beta$ score, where the alert-domain $F_\beta$ score is determined based on the alert-domain recall and the alert-domain precision. In other implementations, the model score for a particular model is based on the alert-domain $F_\beta$ score in combination with one or more other metrics, such as a risk-domain $F_\beta$ score. For example, the alert-domain $F_\beta$ score and a risk-domain $F_\beta$ score can be combined to generate the model score as follows:

$$model\_score = \frac{\alpha \times F_{\beta,alert} + F_{\beta,risk}}{1 + \alpha}$$

where $F_{\beta,alert}$ is the alert-domain $F_\beta$ score, $F_{\beta,risk}$ the risk-domain $F_\beta$ score, and $\alpha$ is a weighting factor. In a particular $^{is}$ the risk-domain $F_\beta$ score is determined implementation, based on risk indices associated with TP-, FN-, and FP-alert indications. The risk indices correspond to timestamps at which the model makes predictions. For example, the model may indicate an alert at times t1, t2, t3 and at times t10-t20, representing alert indications for two alert conditions (e.g., a first alert condition from time t1-t3 and a second alert condition from t10-20. If the true alert condition is from t5-t15, then: t1-t3 risk indices are false positives (FP), t5-t9 are false negatives (FN), t10-t15 are true positives (TP) and t16-t20 are false positives (FP). The risk-domain $F_\beta$ score can be calculated from the number of TP, FN, and FP risk indices (in this case, 6, 5, and 8 respectively).

Figure 5:
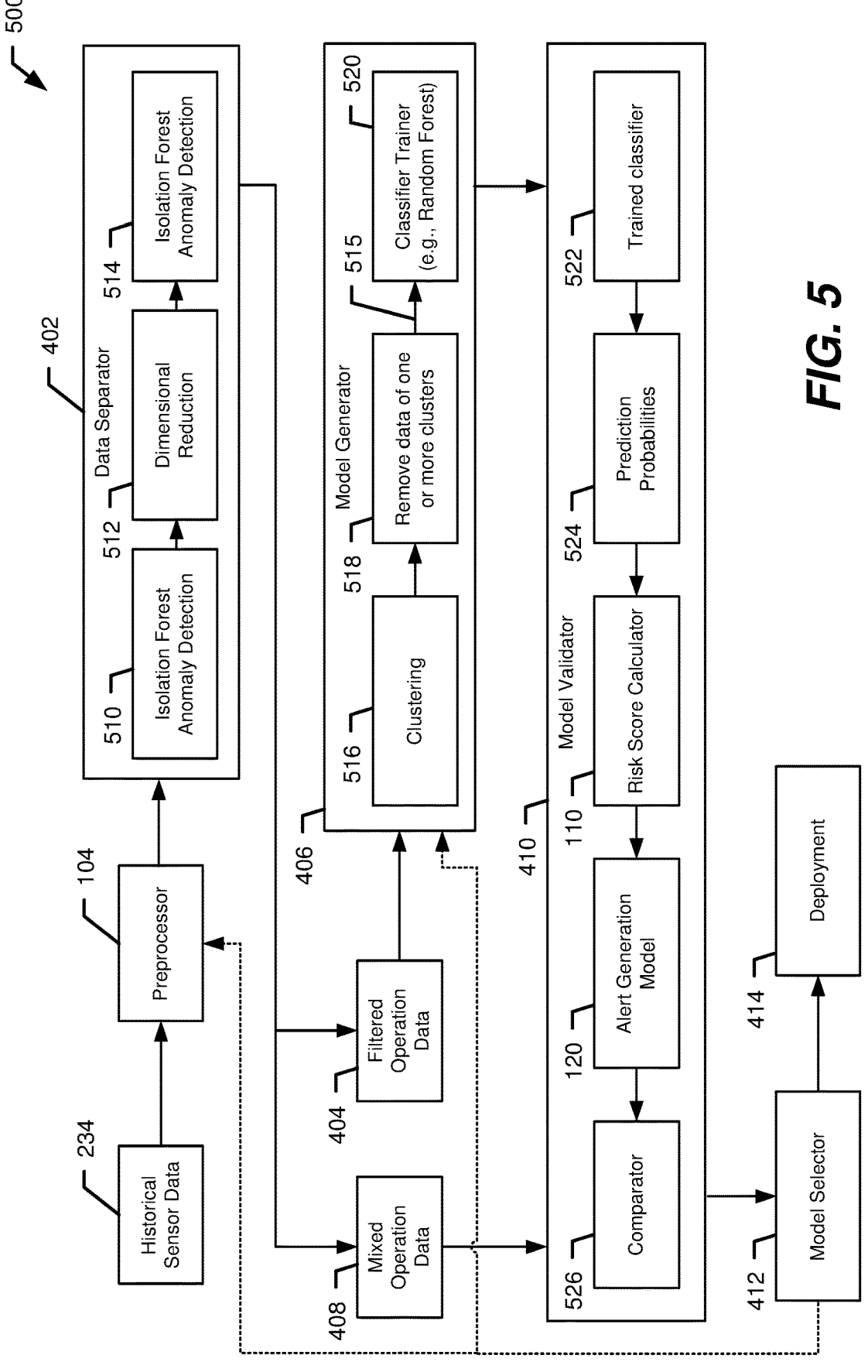
FIG. 5 is another block diagram illustrating particular aspects of operations to generate the anomaly detection model of FIG. 2 in accordance with some examples of the present disclosure.

FIG. 5 is another block diagram 500 illustrating particular aspects of operations to generate the anomaly detection model of FIG. 2 in accordance with some examples of the present disclosure. The operations illustrated in FIG. 5 are performed by one or more processors, such as the processor(s) 220 of FIG. 2, which may include processor(s)

of one or more server or cloud-based computing systems, one or more control systems, one or more desktop or laptop computers, one or more internet of things devices, etc. Data used by and generated by various of the operations are also illustrated in FIG. 5.

In the diagram 500 of FIG. 5, data preprocessing is performed on input data, such as the historical sensor data 234 of FIG. 2, to generate preprocessed data. For example, the data preprocessing may be performed by the preprocessor 104 of FIG. 1 or FIG. 4, which may perform any combination of the preprocessing operations described above, such as cleaning, scaling, imputing values, filtering, etc. The preprocessed data output by the preprocessor 104 is provided to the data separator 402.

FIG. 5 illustrates one particular example of the data separator 402. In the example of FIG. 5, the data separator 402 performs a first level of anomaly detection by generating an isolation forest 510. The isolation forest 510 builds an ensemble of decision trees using the preprocessed data, and data points that are associated with shorter than average path lengths of the decision trees are tagged as corresponding to anomalies. In some implementations, the data separator 402 determines a first anomaly score of the preprocessed data based on the isolation forest 510.

A dimensional reduction operation 512 is performed using the preprocessed data. For example, the dimensional reduction operations 512 may be performed using an autoencoder or using a principal component analysis (PCA) dimensional reduction. The dimensional reduction operation 512 reduces the dimensionality of the variable space (e.g., features space of the preprocessed data) by representing the preprocessed data with a few orthogonal (uncorrelated) variables that capture most of its variability.

In the example of FIG. 5, the data separator 402 also performs a second level of anomaly detection by generating an isolation forest 514 based on a result of the dimensional reduction operation 512. For example, the isolation forest 514 may build an ensemble of decision trees using the data of the principal components, and data points that are associated with shorter than average path lengths of the decision trees are tagged as corresponding to anomalies. In some implementations, the data separator 402 determines a second anomaly score of the data of the principal components based on the isolation forest 514.

The data separator 402 generates the filtered operation data 404 and mixed operation data 408 based on the results generated by the isolation forest 510 and the isolation forest 514. In the example of FIG. 5, the filtered operation data 404 and the mixed operation data 408 include only data corresponding to the result of the dimensional reduction operation 512 (e.g., data corresponding to principal components). In a particular aspect, the filtered operation data 404 includes only data points that are not indicated to be anomalous by the data separator 402, and the mixed operation data 408 includes data points corresponding to normal operation of the monitored asset(s) and data points corresponding to abnormal operation of the monitored asset(s).

The filtered operation data 404 is provided to the model generator 406. In the example of FIG. 5, the model generator 406 uses a clustering approach to select training data 515 from the filtered operation data 404. For example, the model generator 406 performs clustering 516 using the filtered operation data 404 and may include data associated with one or more of the clusters in the training data 515 and/or may exclude data associated with one or more of the clusters from the training data 515.

To illustrate, the model generator 406 may, at the clustering 516 operation, use hierarchical density-based spatial clustering of applications with noise (HDBSCAN) to generate clusters based on the filtered operation data 404. The model generator 406, at block 518, may remove from consideration (e.g., from the training data 515) data of one or more clusters. To illustrate, when the filtered operation data 404 is clustered, individual data points that are associated with anomalies may be assigned to a particular cluster, and that cluster is removed from the data used to generate the training data 515.

The training data 515, cleaned of the individual data points that may be anomalies, is provided to a classifier trainer 520. In this example illustrated in FIG. 5, the classifier trainer 520 generates a trained classifier 522, such as a random forest classifier. The trained classifier 522 is provided to the model validator 410.

The model validator 410 provides the mixed operation data 408 as input to the trained classifier 522 to generate prediction probabilities 524 (e.g., a value for each data point of the mixed operation data 408 that indicates a prediction of the probability that the data point represents normal or abnormal operation).

In a particular implementation, the model validator 410 uses the prediction probabilities, the first anomaly score of the data of the principal components based on the isolation forest 510, and the second anomaly score of the data of the principal components based on the isolation forest 514, to determine a risk score for each data point of the mixed operation data. The model validator 410 may also use the alert generation model 120 to determine whether each data point would generate an alert (e.g., using SPRT, as described above). The model validator 410 provides data indicating the alert determination to a comparator 526 which compares results of the alert generation model 120 to tags of the historical sensor data 234 that indicate whether a particular data point corresponds to known anomalous operation of the monitored assets. For example, the historical sensor data 234 may represent one or more time periods in which abnormal operation of the monitored asset(s) was detected, and such time periods may be tagged in the historical sensor data 234. In this example, the comparator 526 may indicate whether the alert generation model 120 generated an alert for each tagged time period of abnormal operation. The comparator 526 may also indicate how much alerts generated by the alert generation model 120 lagged, led, or overlapped each tagged time period of abnormal operation.

The comparator 526 may determine a model score of the trained classifier 522 based on the comparisons performed between alerts generated by the alert generation model and the tagged historical sensor data 234. The score may be provided to the model selector 412, which may determine based on the score to send the trained classifier 522 to deployment or may determine to generate a new trained classifier 522. In a particular aspect, the model selector 412 may uses one or more metrics that account for alert recall (e.g., a fraction of events that the model catches), alert precision (e.g., a fraction of alerts generated by the model that are true positives), how well the duration of an alert generated by the model matches the actual event duration, or a combination thereof. If the model selector 412 determines to generate a new trained classifier 522, the model selector 412 may cause the preprocessor 104 to change preprocessing operations performed on the historical sensors data 234 to generate the preprocessed data, may cause the model generator 406 to generate a new trained classifier 522 using one or more different settings, or both.

Aspects of FIGS. 4 and 5 can be combined in various implementations. To illustrate, the data separator 402 of FIG. 4 can use the isolation forest 510, the dimensional reduction operation 512, and the isolation forest 514 of FIG. 5 to generate the filtered operation data 404 of FIG. 4. As another example, the model validator 410 of FIG. 4 can use one or more operations described with reference to the model validator 410 of FIG. 5 to validate and/or score a model.

Figure 6:
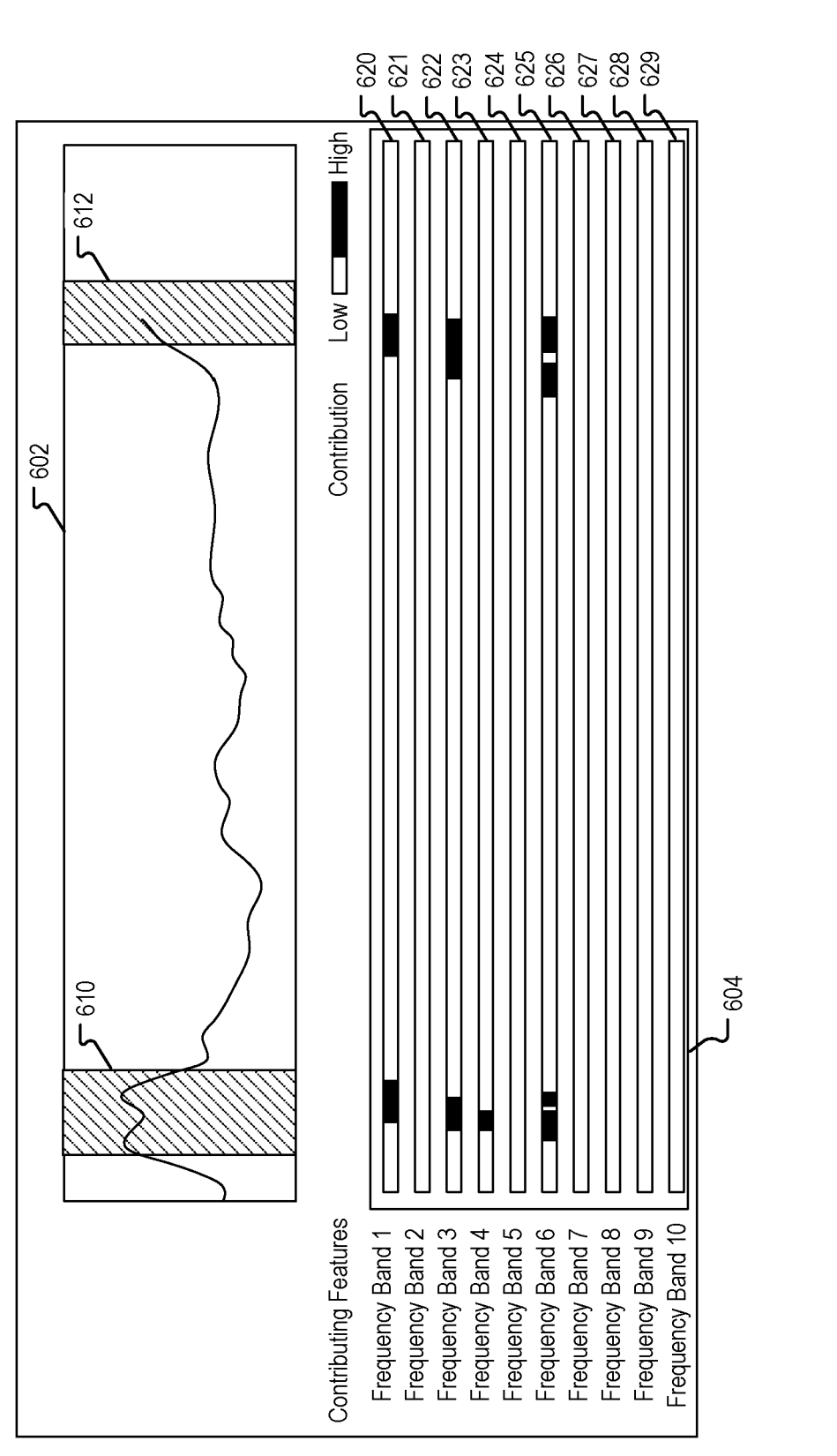
FIG. 6 is a depiction of a graphical user interface that may be generated by the system of FIG. 2 in accordance with some examples of the present disclosure.

FIG. 6 depicts an example of a graphical user interface 600, such as the graphical user interface 264 of FIG. 2. The graphical user interface 600 includes a chart 602 that illustrates values of an anomaly metric (e.g., the anomaly score 222) over a time period. As illustrated, the chart 602 also includes a first alert indication 610 and a second alert indication 612, indicating time periods during which the anomaly metric deviated sufficiently from "normal" behavior of the anomaly metric to generate an alert.

The graphical user interface 600 also includes an indication 604 of one or more sets of feature importance data associated with the alert indication 610 and the alert indication 612. For example, a first indicator 620 extends horizontally under the chart 602 and has different visual characteristics (depicted as white, grey, or black) indicating the relative contributions of a first feature (of received sensor data 102 or input data 308) in determining to generate the first alert indication 610 and the second alert indication 612. Similarly, a second indicator 621 indicates the relative contributions of a second feature in determining to generate the first alert indication 610 and the second alert indication 612. Indicators 622-629 indicate the relative contributions of third, fourth, fifth, sixth, seventh, eighth, ninth, and tenth features, respectively, in determining to generate the first alert indication 610 and the second alert indication 612. Although ten indicators 620-629 for ten features of the sensor data 102 (or of the input data 308) are illustrated, in other implementations fewer than ten features or more than ten features may be used.

For example, the first alert indication 610 shows that the sixth features had a high contribution at a beginning of the first alert indication 610, followed by high contributions of the first features and the third features, and a medium contribution of the fourth features. Providing relative contributions of each feature to an alert determination can assist a subject matter expert to diagnose an underlying cause of abnormal behavior, to determine a remedial action to perform responsive to the alert determination, or both.

Figure 7:
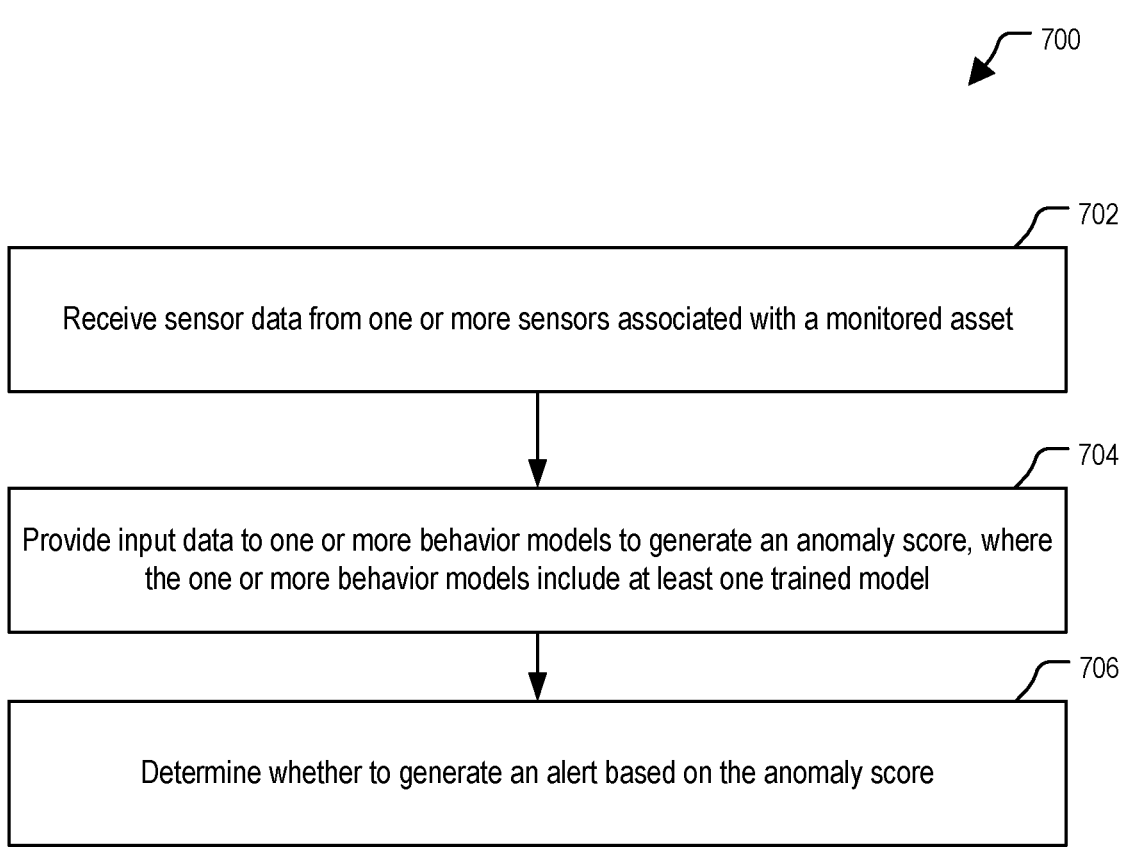
FIG. 7 is a flow chart of a first example of a method of behavior monitoring that may be implemented by the system of FIG. 2.

FIG. 7 is a flow chart of a first example of a method 700 of behavior monitoring that may be implemented by the system of FIG. 2. For example, one or more operations described with reference to FIG. 7 may be performed by the computing device 210, such as by the processor(s) 220 executing the instructions 232.

The method 700 includes, at 702, receiving sensor data from one or more sensors associated with a monitored asset. For example, the receiver 236 of FIG. 2 may receive the sensor data 102 from the sensor(s) 240 and provide the sensor data 102 to the preprocessor 104 executed by the processor(s) 220.

The method 700 includes, at 704, providing input data to the one or more behavior models to generate an anomaly score, where the one or more behavior models include at least one trained model. For example, the preprocessor 104 may generate input data for the anomaly detection model 106 by removing portions of the sensor data 102, adding to the sensor data 102, modifying portions of the sensor data 102, or a combination thereof. In this example, the anomaly detection model 106 generates an anomaly score 222 based on the input data. To illustrate, the anomaly detection model 106 may generate an anomaly score 222 for one or more features of the input data, for one or more time frames represented by the input data, or both. The anomaly score 222 may include, correspond to, or be based on the risk index data 112, the feature importance data 116, or both.

The method 700 includes, at 706, determining whether to generate an alert based on the anomaly score. For example, the alert generation model 120 may determine whether to generate an alert based on the anomaly score 222 using a sequential probability ratio test and historical data, such as the reference anomaly scores 326 or the historical sensor data 234.

Figure 8:
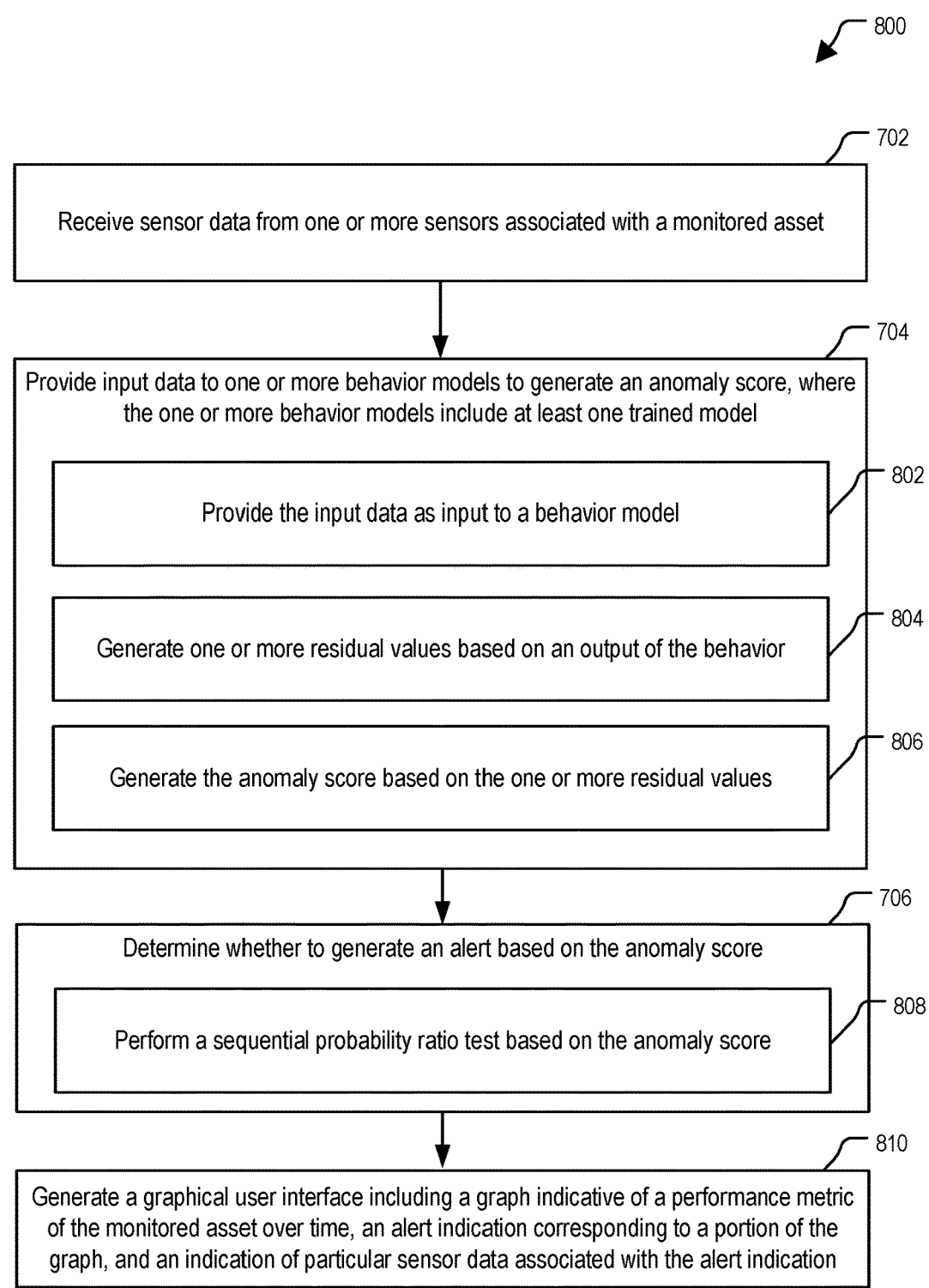
FIG. 8 is a flow chart of a second example of a method of behavior monitoring that may be implemented by the system of FIG. 2.

FIG. 8 is a flow chart of a second example of a method of behavior monitoring that may be implemented by the system of FIG. 2. For example, one or more operations described with reference to FIG. 8 may be performed by the computing device 210, such as by the processor(s) 220 executing the instructions 232.

The method 800 includes, at 702, receiving sensor data from one or more sensors associated with a monitored asset. For example, the receiver 236 of FIG. 2 may receive the sensor data 102 from the sensor(s) 240 and provide the sensor data 102 to the preprocessor 104 executed by the processor(s) 220.

The method 800 also includes, at 704, providing input data to the one or more behavior models to generate an anomaly score, where the one or more behavior models include at least one trained model. For example, the preprocessor 104 may generate input data for the anomaly detection model 106 by removing portions of the sensor data 102, adding to the sensor data 102, modifying portions of the sensor data 102, or a combination thereof.

In FIG. 8, generating the anomaly score includes, at 802, providing the input data as input to a behavior model (e.g., the autoencoder 310, the time series predictor 312, or the feature predictor 314 of FIG. 3). For example, the preprocessor 104 may provide the input data 308 as input to the autoencoder 310 of FIG. 3. In FIG. 8, generating the anomaly score also includes, at 804, generating one or more residual values based on an output of the autoencoder. For example, the residual generator 304 generates the residual data 108 which includes one or more residual values. In FIG. 8, generating the anomaly score further includes, at 806, generating the anomaly score based on the one or more residual values. For example, the anomaly score calculator 306 may generate the anomaly score 222 based on the residual data 108. In this example, the anomaly score 222 may include, correspond to, or be based on the risk index data 112, the feature importance data 116, or both.

The method 800 includes, at 706, determining whether to generate an alert based on the anomaly score. In the method 800, determining whether to generate the alert includes, at 808, performing a sequential probability ratio test based on the anomaly score. For example, the alert generation model 120 may use the reference anomaly scores 326 and the statistical data 322 to perform the sequential probability ratio test and may generate the alert 224 or refrain from generating the alert 224 based on a result of the sequential probability ratio test.

The method 800 also includes, at 810, generating a graphical user interface including a graph indicative of a performance metric of the monitored asset over time, an alert indication corresponding to a portion of the graph, and an indication of particular sensor data associated with the alert indication. For example, the GUI module 226 may generate the GUI 264, an example of which is illustrated in FIG. 6.

FIG. 9 is a flow chart of an example of a method of training one or more models of the system of FIG. 2. The method 900 includes, at 902, receiving historical sensor data indicative of operation of the monitored asset, and at 904, preprocessing the historical sensor data using one or more data cleaning operations, data scaling operations, data imputation operations, data filtering operations, or a combination thereof. For example, the preprocessor 104 may receive and preprocess the historical sensor data to generate preprocessed historical sensor data.

The method 900 also includes, at 906, performing an isolation forest analysis based on historical data (e.g., based on the preprocessed historical sensor data). For example, the data separator 402 may use the isolation forest 510 to detect anomalies in the preprocessed historical sensor data.

The method 900 further includes, at 908, determining, at 910, training data and testing data based on the historical sensor data. The testing data includes data points represents both normal and abnormal behavior, and the training data excludes data points identified as representing abnormal behavior. For example, the data separator 402 may generate the filtered operation data 404 (which is used by the model generator 406 to generate training data) and the mixed operation data 408 (which is used as testing data by the model validator 410). In this example, the model generator 406 may use clustering to remove additional data points from the filtered operation data 404 to generate the training data 515.

The method 900 also includes, at 914, training at least one behavior model of one or more behavior models based on the historical sensor data (e.g., using the training data). For example, the model generator 406 can generate, train, or generate and train one or more models using the normal operation data 404, as described with reference to FIGS. 4 and 5.

Figure 10:
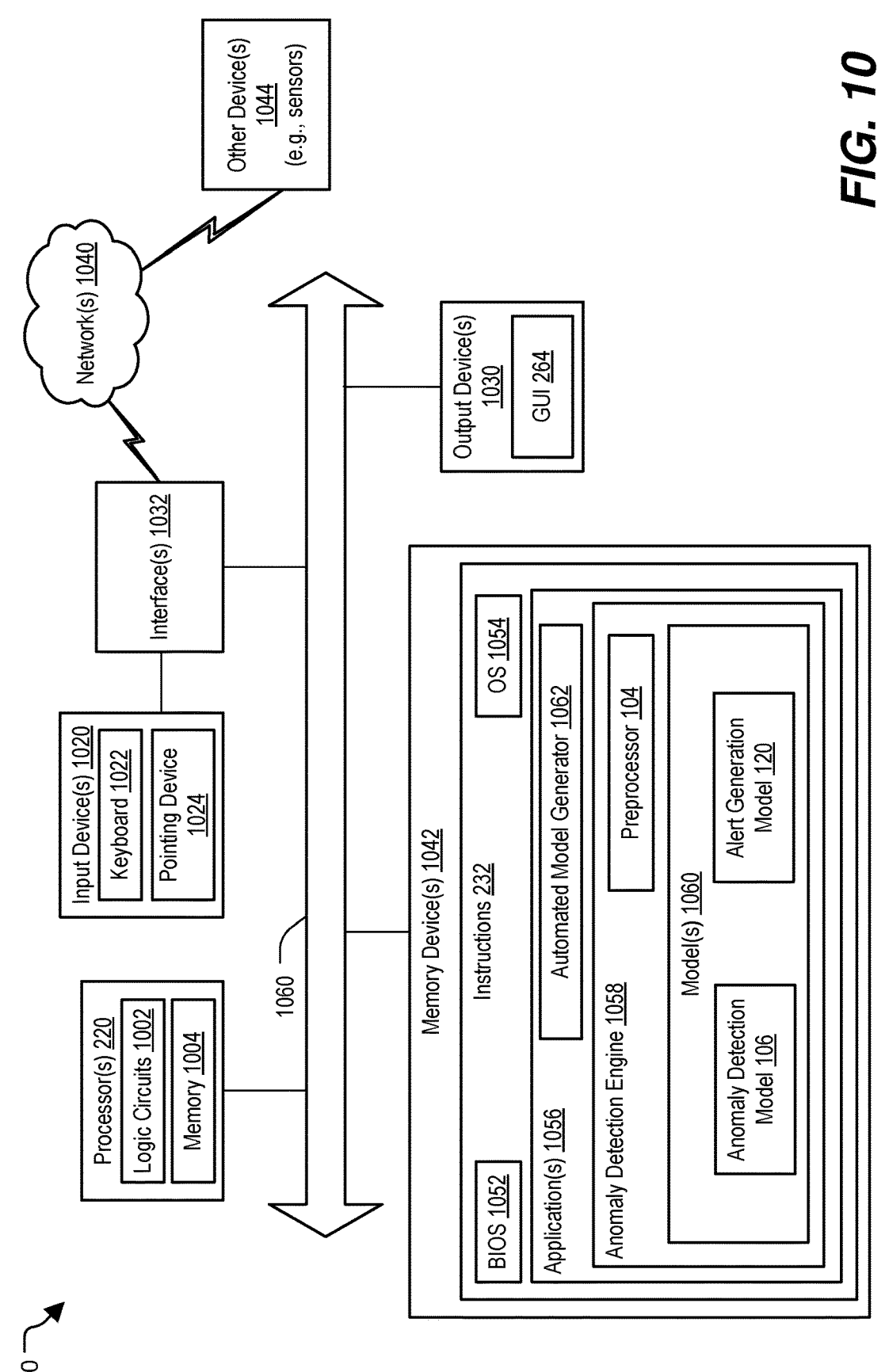
FIG. 10 illustrates an example of a computer system corresponding to, including, or included within the system of FIG. 2 according to particular implementations.

FIG. 10 illustrates an example of a computer system 1000 corresponding to one or more of the systems of FIGS. 2 or 3 according to particular implementations. For example, the computer system 1000 is configured to initiate, perform, or control one or more of the operations described with reference to FIGS. 1, 4, or 5. The computer system 1000 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 1000 is illustrated, the term "system" includes any collection of systems or sub-systems that individually or jointly execute a set, or multiple sets, of instructions to perform one or more computer functions.

While FIG. 10 illustrates one example of the computer system 1000, other computer systems or computing architectures and configurations may be used for carrying out the automated model generation or asset monitoring operations disclosed herein. The computer system 1000 includes the one or more processors 220. Each processor of the one or more processors 220 can include a single processing core or multiple processing cores that operate sequentially, in parallel, or sequentially at times and in parallel at other times. Each processor of the one or more processors 220 includes circuitry defining a plurality of logic circuits 1002, working memory 1004 (e.g., registers and cache memory), communication circuits, etc., which together enable the processor(s) 220 to control the operations performed by the computer system 1000 and enable the processor(s) 220 to generate a useful result based on analysis of particular data and execution of specific instructions.

The processor(s) 220 are configured to interact with other components or subsystems of the computer system 1000 via a bus 1060. The bus 1060 is illustrative of any interconnection scheme serving to link the subsystems of the computer system 1000, external subsystems or devices, or any combination thereof. The bus 1060 includes a plurality of conductors to facilitate communication of electrical and/or electromagnetic signals between the components or subsystems of the computer system 1000. Additionally, the bus 1060 includes one or more bus controllers or other circuits (e.g., transmitters and receivers) that manage signaling via the plurality of conductors and that cause signals sent via the plurality of conductors to conform to particular communication protocols.

The computer system 1000 also includes the one or more memory devices 1042. The memory device(s) 1042 include any suitable computer-readable storage device depending on, for example, whether data access needs to be bi-directional or unidirectional, speed of data access required, memory capacity required, other factors related to data access, or any combination thereof. Generally, the memory device(s) 1042 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory device(s) 1042 include circuits and structures and are not merely signals or other transitory phenomena (i.e., are non-transitory media).

In the example illustrated in FIG. 10, the memory device(s) 1042 store the instructions 232 that are executable by the processor(s) 220 to perform various operations and functions. The instructions 232 include instructions to enable the various components and subsystems of the computer system 1000 to operate, interact with one another, and interact with a user, such as a basic input/output system (BIOS) 1052 and an operating system (OS) 1054. Additionally, the instructions 232 include one or more applications 1056, scripts, or other program code to enable the processor(s) 220 to perform the operations described herein. For example, in FIG. 10, the instructions 232 include automated model building instructions 1062 configured to initiate, control, or perform one or more model generation or model training operations described with reference to FIGS. 4 and 5. Additionally, in the example of FIG. 10, the instructions include an anomaly detection engine 1058 that is configured to monitor sensor data to determine whether a monitored asset is performing abnormally. In FIG. 10, the anomaly detection engine 1058 uses one or more models 106 to monitor the sensor data. To illustrate, the anomaly detection engine 1058 uses the anomaly detection model 106, the alert generation model 120, or both. Additionally, the anomaly detection engine 1058 uses the preprocessor 104 to preprocess the sensor data before providing the sensor data to one or more of the model(s) 106.

In FIG. 10, the computer system 1000 also includes one or more output devices 1030, one or more input devices 1020, and one or more interface devices 1032. Each of the output device(s) 1030, the input device(s) 1020, and the interface device(s) 1032 can be coupled to the bus 1060 via a port or connector, such as a Universal Serial Bus port, a digital visual interface (DVI) port, a serial ATA (SATA) port, a small computer system interface (SCSI) port, a high-definition media interface (HDMI) port, or another serial or parallel port. In some implementations, one or more of the output device(s) 1030, the input device(s) 1020, the interface device(s) 1032 is coupled to or integrated within a housing with the processor(s) 220 and the memory device(s) 1042, in which case the connections to the bus 1060 can be internal, such as via an expansion slot or other card-to-card connector. In other implementations, the processor(s) 220 and the memory device(s) 1042 are integrated within a housing that includes one or more external ports, and one or more of the output device(s) 1030, the input device(s) 1020, the interface device(s) 1032 is coupled to the bus 1060 via the external port(s).

Examples of the output device(s) 1030 include display devices (e.g., the display device 262 of FIG. 2), speakers, printers, televisions, projectors, or other devices to provide output of data in a manner that is perceptible by a user. Examples of the input device(s) 1020 include buttons, switches, knobs, a keyboard 1022, a pointing device 1024, a biometric device, a microphone, a motion sensor, or another device to detect user input actions. The pointing device 1024 includes, for example, one or more of a mouse, a stylus, a track ball, a pen, a touch pad, a touch screen, a tablet, another device that is useful for interacting with a graphical user interface, or any combination thereof. A particular device may be an input device 1020 and an output device 1030. For example, the particular device may be a touch screen.

The interface device(s) 1032 are configured to enable the computer system 1000 to communicate with one or more other devices 1044 directly or via one or more networks 1040. For example, the interface device(s) 1032 may encode data in electrical and/or electromagnetic signals that are transmitted to the other device(s) 1044 as control signals or packet-based communication using pre-defined communication protocols. As another example, the interface device(s) 1032 may receive and decode electrical and/or electromagnetic signals that are transmitted by the other device(s) 1044. To illustrate, the other device(s) 1044 may include the sensor(s) 240 of FIG. 2. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In conjunction with the described devices and techniques, an apparatus for detecting anomalous operation of a monitored asset includes means for receiving sensor data from one or more sensors associated with a monitored asset. For example, the means for receiving can correspond to the receiver 236, the processor(s) 220, the preprocessor 104, one or more other circuits or devices to receive sensor data, or any combination thereof.

The apparatus includes means for providing input data to one or more behavior models to generate an anomaly score, where the one or more behavior models include at least one trained model. For example, the means for providing the input data can correspond to the preprocessor 104, the processor(s) 220, one or more other circuits or devices to provide input data to behavior models, or any combination thereof.

The apparatus also includes means for determining whether to generate an alert based on the anomaly score. For example, the means for determining whether to generate an alert can correspond to the alert generation model 120, the processor(s) 220, one or more other circuits or devices to determine whether to generate an alert, or any combination thereof.

Particular aspects of the disclosure are described below in the following clauses:

According to Clause 1, a method of behavior monitoring includes: determining, by one or more trained behavior models associated with a monitored asset, output data indicative of operation of the monitored asset; determining a risk score based on the output data; determining feature importance data based on the output data; and determining whether to generate an alert based on the risk score and the feature importance data.

Clause 2 includes the method of Clause 1, wherein the output data is determined based on input data including or based on sensor data from one or more sensors associated with the monitored asset.

Clause 3 includes the method of Clause 1 or Clause 2, wherein the one or more trained behavior models are configured to generate one or more predicted values based on sensor data from one or more sensors associated with the monitored asset.

Clause 4 includes the method of Clause 3, further including determining one or more residual values based on the one or more predicted values and sensor data.

Clause 5 includes the method of any of Clauses 1 to 4, further including: obtaining sensor data for one or more sensors associated with the monitored asset, wherein the sensor data includes multiple time series of data samples, each time series representing output of a single sensor; performing one or more preprocessing operations to generate, based on the sensor data, input data for the one or more trained behavior models, wherein the one or more trained behavior models determine the output data based on the input data; and determining one or more residual values based on a comparison of a predicted data sample of the output data to a corresponding input data value of the input data.

Clause 6 includes the method of Clause 5, further including selectively masking out at least one residual value of the one or more residual values to generate masked residual data, wherein the at least one residual value is masked out based on a particular preprocessing operation performed to generate an input data value used to determine the at least one residual value, wherein the risk score, the feature importance data, or both, are determined based on the masked residual data.

Clause 7 includes the method of Clause 6, wherein the at least one residual value is selectively masked out further based on a user configuration setting associated with a tolerance for false positive alerts.

Clause 8 includes the method of Clause 5, wherein the risk score is determined based on an L2-norm of a rolling mean of the residual values, and wherein the rolling mean is determined based on a sliding aggregation window.

Clause 9 includes the method of Clause 5, wherein the feature importance data is determined based on a rolling mean of absolute values of the residual values.

Clause 10 includes the method of Clause 5, wherein the one or more preprocessing operations includes one or more of: removing outlying data samples; removing data associated with particular events; denoising, imputation one or more values; resampling data values; scaling data values; normalizing data values; determining one or more data values based on one or more other data values; or performing one or more domain transformations.

Clause 11 includes the method of any of Clauses 1 to 10, further including: concatenating the risk score for a particular feature and time step and the feature importance data for the particular feature and time step to generate concatenated data; and providing the concatenated data as input to an alert generation model to determine whether to generate the alert.

Clause 12 includes the method of Clause 5, further including, performing, by the alert generation model, a sequential probability ratio test based on a set of anomaly scores and a set of reference anomaly scores, wherein an anomaly score of the set of anomaly scores includes concatenated data.

Clause 13 includes the method of any of Clauses 1 to 12, further including, responsive to a determination to generate the alert generating, outputting an alert indication that includes the feature importance data.

Clause 14 includes the method of any of Clauses 1 to 13, wherein the one or more trained behavior models include one or more dimensional reduction models, one or more autoencoders, one or more time series predictors, one or more feature predictors, or a combination thereof.

Clause 15 includes the method of any of Clauses 1 to 14, further including: obtaining sensor data for one or more sensors associated with the monitored asset, wherein the sensor data indicate measurements of one or more physical characteristics, one or more electromagnetic characteristics, one or more radiologic characteristics, or a combination thereof, of the monitored asset; and providing input data based on the sensor data as input to the one or more trained behavior models, wherein the one or more trained behavior models determine the output data based on the input data.

According to Clause 16, a computing device includes: one or more memory devices storing instructions and one or more trained behavior models associated with a monitored asset; and one or more processors configured to execute the instructions to perform operations comprising: determining, using the one or more trained behavior models, output data indicative of operation of the monitored asset; determining a risk score based on the output data; determining feature importance data based on the output data; and determining whether to generate an alert based on the risk score and the feature importance data.

Clause 17 includes the computing device of Clause 16, wherein the operations further include: obtaining sensor data for one or more sensors associated with the monitored asset, wherein the sensor data includes multiple time series of data samples, each time series representing output of a single sensor; performing one or more preprocessing operations to generate, based on the sensor data, input data for the one or more trained behavior models, wherein the one or more trained behavior models determine the output data based on the input data; selectively masking out one or more values of the output data to generate masked output data; and determining one or more residual values based on a comparison of a predicted data sample of the masked output data to a corresponding input data value of the input data, wherein the risk score, the feature importance data, or both, are determined based on the one or more residual values.

Clause 18 includes the computing device of Clause 17, wherein the one or more values of the output data are selectively masked out based on a user configuration setting associated with a tolerance for false positive alerts.

According to Clause 19, a computing-readable storage device storing instructions that are executable by one or more processors to cause the one or more processors to: determine, using one or more trained behavior models associated with a monitored asset, output data indicative of operation of the monitored asset; determine a risk score based on the output data; determine feature importance data based on the output data; and determine whether to generate an alert based on the risk score and the feature importance data.

Clause 20 includes the computing-readable storage device of claim 19, wherein the instructions are further executable to cause the one or more processors to: obtain sensor data for one or more sensors associated with the monitored asset; perform one or more preprocessing operations to generate, based on the sensor data, input data for the one or more trained behavior models, wherein the one or more trained behavior models determine the output data based on the input data; determine one or more residual values based on a comparison of a predicted data sample of the output data to a corresponding input data value of the input data; and selectively mask out at least one residual value of the one or more residual values to generate masked residual data, wherein the risk score, the feature importance data, or both, are determined based on the masked residual data.

According to Clause 21, a method of behavior monitoring includes: receiving sensor data from one or more sensors associated with a monitored asset; providing input data to one or more behavior models to generate an anomaly score, wherein the one or more behavior models include at least one trained model; and determining whether to generate an alert based on the anomaly score.

Clause 22 includes the method of Clause 21, wherein the monitored asset includes a mechanical device, an electromechanical device, an electrical device, an electronic device, or a combination thereof.

Clause 23 includes the method of Clause 21 or Clause 22, wherein generating the anomaly score by the one or more behavior models includes: providing the input data as input to a behavior model of the one or more behavior models; generating one or more residual values based on an output of the behavior model; and generating the anomaly score based on the one or more residual values.

Clause 24 includes the method of Clause 23, wherein the behavior model includes or corresponds to an autoencoder.

Clause 25 includes the method of Clause 23 or Clause 24, wherein the behavior model includes or corresponds to a time series predictor.

Clause 26 includes the method of any of Clauses 23 to 25, wherein the behavior model includes or corresponds to a feature predictor.

Clause 27 includes the method of any of Clauses 21 to 26, wherein determining whether to generate the alert based on the anomaly score includes performing a sequential probability ratio test based on the anomaly score.

Clause 28 includes the method of any of Clauses 21 to 27, further including, prior to receiving the sensor data: receiving historical sensor data indicative of operation of the monitored asset; and training at least one behavior model of the one or more behavior models based on the historical sensor data.

Clause 29 includes the method of Clause 28, further including: determining, based on the historical sensor data, testing data that includes data points representing normal behavior and includes data points representing abnormal behavior; determining, based on the historical sensor data, training data that excludes data points identified as representing abnormal behavior, wherein the at least one behavior model is trained using the training data; and testing the at least one behavior model based on the testing data.

Clause 30 includes the method of Clause 29, further including, before determining the testing data and the training data, preprocessing the historical sensor data using one or more data cleaning operations, data scaling operations, data imputation operations, data filtering operations, or a combination thereof, wherein the testing data and the training data are determined based on the preprocessed historical sensor data.

Clause 31 includes the method of any of Clauses 21 to 30, wherein determining whether to generate the alert based on the anomaly score includes evaluating a set of anomaly scores based on a sequential probability ratio test to determine whether one or more anomaly scores of the set of the anomaly scores indicates deviation from normal operation of the monitored asset.

Clause 32 includes the method of any of Clauses 21 to 31, further including generating a graphical user interface including: a graph indicative of a performance metric of the monitored asset over time; an alert indication corresponding to a portion of the graph; and an indication of particular sensor data associated with the alert indication.

According to Clause 33, a system for behavior monitoring includes: one or more processors configured to: receive sensor data from one or more sensors associated with a monitored asset; provide input data to one or more behavior models to generate an anomaly score, wherein the one or more behavior models include at least one trained model; and determine whether to generate an alert based on the anomaly score.

Clause 34 includes the system of Clause 33, wherein the monitored asset includes a mechanical device, an electromechanical device, an electrical device, an electronic device, or a combination thereof.

Clause 35 includes the system of Clause 33 or Clause 34, wherein generating the anomaly score by the one or more behavior models includes: providing the input data as input to a behavior model of the one or more behavior models; generating one or more residual values based on an output of the behavior model; and generating the anomaly score based on the one or more residual values.

Clause 36 includes the system of Clause 35, wherein the behavior model includes or corresponds to an autoencoder.

Clause 37 includes the system of Clause 35 or Clause 36, wherein the behavior model includes or corresponds to a time series predictor.

Clause 38 includes the system of any of Clauses 35 to 37, wherein the behavior model includes or corresponds to a feature predictor.

Clause 39 includes the system of any of Clauses 33 to 38, wherein determining whether to generate the alert based on the anomaly score includes performing a sequential probability ratio test based on the anomaly score.

Clause 40 includes the system of any of Clauses 33 to 39, wherein the one or more processors are further configured to, prior to receiving the sensor data: receive historical sensor data indicative of operation of the monitored asset; and train at least one behavior model of the one or more behavior models based on the historical sensor data.

Clause 41 includes the system of Clause 40, wherein the one or more processors are further configured to: determine, based on the historical sensor data, testing data that includes a first set of data points and a second set of data points, wherein the first set of data points represents normal behavior and the second set of data points represents abnormal behavior; determine, based on the historical sensor data, training data that includes a third set of data points, wherein the third set of data points represents normal behavior and excludes data points representing abnormal behavior, wherein the at least one behavior model is trained using the training data; and test the at least one behavior model based on the testing data.

Clause 42 includes the system of Clause 41, wherein the one or more processors are further configured to, before determining testing data and the training data, preprocess the historical sensor data using one or more data cleaning operations, data scaling operations, data imputation operations, data filtering operations, or a combination thereof, wherein the testing data and the training data are determined based on the preprocessed historical sensor data.

Clause 43 includes the system of any of Clauses 33 to 42, wherein determining whether to generate the alert based on the anomaly score includes evaluating a set of anomaly scores based on a sequential probability ratio test to determine whether one or more anomaly scores of the set of the anomaly scores indicates deviation from normal operation of the monitored asset.

Clause 44 includes the system of any of Clauses 33 to 43, wherein the one or more processors are further configured to generate a graphical user interface including: a graph indicative of a performance metric of the monitored asset over time; an alert indication corresponding to a portion of the graph; and an indication of particular sensor data associated with the alert indication.

According to Clause 45, a computer-readable storage device stores instructions that, when executed by one or more processors, cause the one or more processors to: receive sensor data from one or more sensors associated with a monitored asset; provide input data to one or more behavior models, wherein the one or more behavior models include at least one trained model; generate one or more residual values based on an output of the one or more behavior model; generate an anomaly score based on the one or more residual values; and determine whether to generate an alert based on the anomaly score.

Clause 46 includes the computer-readable storage device of Clause 45, wherein the monitored asset includes a mechanical device, an electromechanical device, an electrical device, an electronic device, or a combination thereof.

Clause 47 includes the computer-readable storage device of Clause 45 or Clause 46, wherein the one or more behavior models include an autoencoder.

Clause 48 includes the computer-readable storage device of any of Clauses 45 to 47, wherein the one or more behavior models include a time series predictor.

Clause 49 includes the computer-readable storage device of any of Clauses 45 to 48, wherein the one or more behavior models include a feature predictor.

Clause 50 includes the computer-readable storage device of any of Clauses 45 to 49, wherein determining whether to generate the alert based on the anomaly score includes performing a sequential probability ratio test based on the anomaly score.

Clause 51 includes the computer-readable storage device of any of Clauses 45 to 50, wherein the instructions, when executed by the one or more processors, further cause the one or more processors to, prior to receiving the sensor data: receive historical sensor data indicative of operation of the monitored asset; and train at least one behavior model of the one or more behavior models based on the historical sensor data.

Clause 52 includes the computer-readable storage device of Clause 51, wherein the instructions, when executed by the one or more processors, further cause the one or more processors to: determine, based on the historical sensor data, testing data that includes data points representing normal behavior and includes data points representing abnormal behavior; determine, based on the historical sensor data, training data that excludes data points identified as representing abnormal behavior, wherein the at least one behavior model is trained using the training data; and test the at least one behavior model based on the testing data.

Clause 53 includes the computer-readable storage device of Clause 52, wherein the instructions, when executed by the one or more processors, further cause the one or more processors to, before determining testing data and the training data, preprocess the historical sensor data using one or more data cleaning operations, data scaling operations, data imputation operations, data filtering operations, or a combination thereof, wherein the testing data and the training data are determined based on the preprocessed historical sensor data.

Clause 54 includes the computer-readable storage device of any of Clauses 45 to 53, wherein determining whether to generate the alert based on the anomaly score includes evaluating a set of anomaly scores based on a sequential probability ratio test to determine whether one or more anomaly scores of the set of the anomaly scores indicates deviation from normal operation of the monitored asset.

Clause 55 includes the computer-readable storage device of any of Clauses 45 to 54, wherein the instructions, when executed by the one or more processors, further cause the one or more processors to generate a graphical user interface including: a graph indicative of a performance metric of the monitored asset over time; an alert indication corresponding to a portion of the graph; and an indication of particular sensor data associated with the alert indication.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of behavior monitoring, the method comprising:

determining, by one or more trained behavior models associated with a monitored asset, output data indicative of operation of the monitored asset;

determining one or more residual values based on a comparison of a predicted data sample of the output data to a corresponding input data value of input data;

selectively masking out at least one residual value of the one or more residual values to generate masked residual data, wherein the at least one residual value is masked out responsive to the corresponding input data value being generated by a particular pre-processing operation;

determining a risk score based on the masked residual data;

determining feature importance data based on the output data; and determining whether to generate an alert based on the risk score and the feature importance data.

2. The method of claim 1, wherein the output data is determined based on input data including or based on sensor data from one or more sensors associated with the monitored asset.

3. The method of claim 1, wherein the one or more trained behavior models are configured to generate one or more predicted values based on sensor data from one or more sensors associated with the monitored asset.

4. The method of claim 3, wherein the one or more residual values are based on the one or more predicted values and sensor data.

5. The method of claim 1, further comprising:

obtaining sensor data for one or more sensors associated with the monitored asset, wherein the sensor data includes multiple time series of data samples, each time series representing output of a single sensor; and performing one or more preprocessing operations to generate, based on the sensor data, input data for the one or more trained behavior models, wherein the one or more trained behavior models determine the output data based on the input data, the one or more preprocessing operations including the particular pre-processing operation.

6. The method of claim 5, wherein the masked residual data includes at least one second residual value associated with a second particular preprocessing operation distinct from the particular pre- processing operation.

7. The method of claim 1, wherein the at least one residual value is selectively masked out further based on a user configuration setting associated with a tolerance for false positive alerts.

8. The method of claim 5, wherein the one or more preprocessing operations includes one or more of: removing outlying data samples; removing data associated with particular events; denoising, imputation of one or more values; resampling data values;

scaling data values; normalizing data values; determining one or more data values based on one or more other data values; or performing one or more domain transformations.

9. The method of claim 1, further comprising:

concatenating the risk score for a particular feature and time step and the feature importance data for the particular feature and time step to generate concatenated data; and providing the concatenated data as input to an alert generation model to determine whether to generate the alert.

10. The method of claim 9, further comprising, performing, by the alert generation model, a sequential probability ratio test based on a set of anomaly scores and a set of reference anomaly scores, wherein an anomaly score of the set of anomaly scores includes the concatenated data.

11. The method of claim 1, further comprising, responsive to a determination to generate the alert generating, outputting an alert indication that includes the feature importance data.

12. The method of claim 1, wherein the one or more trained behavior models include one or more dimensional reduction models, one or more autoencoders, one or more time series predictors, one or more feature predictors, or a combination thereof.

13. The method of claim 1, further comprising:

obtaining sensor data for one or more sensors associated with the monitored asset, wherein the sensor data indicate measurements of one or more physical characteristics, one or more electromagnetic characteristics, one or more radiologic characteristics, or a combination thereof, of the monitored asset; and providing input data based on the sensor data as input to the one or more trained behavior models, wherein the one or more trained behavior models determine the output data based on the input data.

14. A computing device comprising:

one or more memory devices storing instructions and one or more trained behavior models associated with a monitored asset; and one or more processors configured to execute the instructions to perform operations comprising:

determining, using the one or more trained behavior models, output data indicative of operation of the monitored asset;

determining one or more residual values based on a comparison of a predicted data sample of the output data to a corresponding input data value of input data;

selectively masking out at least one residual value of the one or more residual values to generate masked residual data, wherein the at least one residual value is masked out responsive to the corresponding input data value being generated by a particular pre-processing operation;

determining a risk score based on the masked residual data;

determining feature importance data based on the output data; and determining whether to generate an alert based on the risk score and the feature importance data.

15. The computing device of claim 14, wherein the operations further comprise:

obtaining sensor data for one or more sensors associated with the monitored asset, wherein the sensor data includes multiple time series of data samples, each time series representing output of a single sensor; and performing one or more preprocessing operations to generate, based on the sensor data, input data for the one or more trained behavior models, wherein the one or more trained behavior models determine the output data based on the input data, the one or more preprocessing operations including the particular preprocessing operation.

16. The computing device of claim 15, wherein the at least one residual value is selectively masked out based on a user configuration setting associated with a tolerance for false positive alerts.

17. A computer-readable storage device storing instructions that are executable by one or more processors to cause the one or more processors to:

determine, using one or more trained behavior models associated with a monitored asset, output data indicative of operation of the monitored asset;

determine a risk score based on the output data;

determine feature importance data based on the output data, wherein the feature importance data comprises a plurality of feature importance values, and wherein each feature importance value corresponds to a different feature of the output data; and determine whether to generate an alert based on the risk score and the feature importance data.

18. The computer-readable storage device of claim 17, wherein the feature importance data indicates a relative importance of each particular feature of the output data.

19. The computer-readable storage device of claim 17, wherein the feature importance data indicates a ranking of the corresponding features of the output data.

20. The computer-readable storage device of claim 17, wherein the feature importance data comprises a feature match score, the feature match score based on a difference between feature importance determined based on the output data and expected feature importance associated with the operation of the monitored asset.

\* \* \* \* \*